US012304780B2

(12) United States Patent
Ogawa et al.

(10) Patent No.: US 12,304,780 B2
(45) Date of Patent: May 20, 2025

(54) INFORMATION PROCESSING APPARATUS FOR CRANES

(71) Applicant: GOGOH CO., LTD., Aichi (JP)

(72) Inventors: Kouji Ogawa, Aichi (JP); Teruhiko Sawada, Aichi (JP)

(73) Assignee: GOGOH CO., LTD., Aichi (JP)

(*) Notice: Subject to any disclaimer, the term of this patent is extended or adjusted under 35 U.S.C. 154(b) by 244 days.

(21) Appl. No.: 18/295,586

(22) Filed: Apr. 4, 2023

(65) Prior Publication Data

US 2023/0242380 A1 Aug. 3, 2023

Related U.S. Application Data

(63) Continuation of application No. PCT/JP2021/036901, filed on Oct. 6, 2021.

(30) Foreign Application Priority Data

Oct. 9, 2020 (JP) ................................ 2020-171200

(51) Int. Cl.
*B66C 13/46* (2006.01)
*B66C 13/48* (2006.01)
*B66C 15/06* (2006.01)

(52) U.S. Cl.
CPC .............. *B66C 13/46* (2013.01); *B66C 13/48* (2013.01); *B66C 15/06* (2013.01)

(58) Field of Classification Search
CPC .......... B66C 13/46; B66C 13/48; B66C 15/06
See application file for complete search history.

(56) References Cited

U.S. PATENT DOCUMENTS 5,117,992 A 6/1992 Simkus, Jr. et al.
2013/0251498 A1 9/2013 Dahlen et al.
(Continued)

FOREIGN PATENT DOCUMENTS

JP 2014-069933 4/2014
JP 2014-234260 12/2014
(Continued)

OTHER PUBLICATIONS

International Search Report from International Application No. PCT/JP2021/036901 dated Jan. 11, 2022.

*Primary Examiner* — Michael D Lang
(74) *Attorney, Agent, or Firm* — Beyer Law Group LLP

(57) ABSTRACT

A camera and a laser radar are attached to the hoist of an overhead crane. Image data and three-dimensional point clouds are acquired during operation and accumulated as operation result data. An information processing apparatus displays the crane's movement trajectory on the terminal and predicts maintenance timing based on operation result data, evaluates a degree of danger and detects an occurrence of accident based on a positional relationship between the crane and an operator, performs optimization of a movement path, a transport sequence of multiple suspended loads, a layout in the facility, and the like, and performs post-operation diagnosis for the degree of danger and operation efficiency of the crane. In addition, the crane is used to scan the inside of the facility to detect abnormalities such as fires and suspicious persons after the work hours of the facility. These treatments can improve the usefulness of the crane.

9 Claims, 24 Drawing Sheets

(56) References Cited

U.S. PATENT DOCUMENTS

| | | | |
|---|---|---|---|
| 2016/0185574 | A1 | 6/2016 | Enomoto et al. |
| 2018/0018641 | A1 | 1/2018 | Jussel et al. |

FOREIGN PATENT DOCUMENTS

| | | | | | |
|---|---|---|---|---|---|
| JP | 2015-068019 | | | 4/2015 | |
| JP | 2015-189528 | | | 11/2015 | |
| JP | 2016193473 | A | * | 11/2016 | .............. B25J 19/06 |
| JP | 2018-014092 | | | 1/2018 | |
| JP | 2018-095373 | | | 6/2018 | |
| JP | 6601903 | | | 12/2019 | |
| JP | 6630881 | | | 12/2019 | |
| WO | 2017/138311 | | | 8/2017 | |
| WO | 2017/141320 | | | 8/2017 | |

* cited by examiner

Fig. 13
transport image
graph of danger level
Slide Bar
danger level
70%
Past Case 1
Past Case 2
Normal Operation
Cause of Danger
* Person behind the load
* The state continued 10 sec

INFORMATION PROCESSING APPARATUS FOR CRANES

CLAIM OF PRIORITY AND INCORPORATION BY REFERENCE

This application is a Continuation of International Patent Application No. PCT/JP2021/036901 (Publication No. WO 2022/075340), filed on Oct. 6, 2021, which claims priority to Japanese Patent Application No. 2020-171200, filed on Oct. 9, 2020, each of which is hereby incorporated by reference. This application also incorporates by reference Japanese Patent No. 7228944, registered on Feb. 16, 2023, Japanese Patent Application Publication Number 2022-185104, published on Dec. 13, 2022, and Japanese Patent Application Publication Number 2022-188244, published on Dec. 20, 2022, all of which claim priority to Japanese Patent Application No. 2020-171200, filed on Oct. 9, 2020.

BACKGROUND OF THE INVENTION

1. Field of the Invention

The present invention relates to an information processing apparatus that processes information acquired during the operation of a crane that moves a suspended load within a specified area.

2. Description of the Related Art

In facilities such as factories and warehouses, overhead cranes are used for the transportation of heavy loads. The overhead crane transports the suspended load by horizontally moving the lifting device for hanging the suspended load, such as a hoist or trolley, along the traveling rail fixed in the building.

In recent years, various proposals have been made to increase the usefulness relating to overhead cranes. For example, Japanese Patent No. 6630881 discloses a technique for identifying the horizontal position of a crane based on an image taken by a camera moving with the crane. If the location of the crane can be identified, this makes it possible to utilize the crane for various applications. Japanese Patent No. 6601903 discloses a technique for determining whether there are no people in the hazardous area around the suspended load by a camera attached to a crane.

BRIEF DESCRIPTION OF THE INVENTION

Safety operation of cranes is an important issue. Japanese Patent No. 6601903 uses the presence or absence of a person in the dangerous area around the suspended load, however, whether it is safe or not cannot be determined by this method before lifting the suspended load, and descending it, etc. In addition, even during transportation, the dangerous area differs depending on the direction and speed of the suspended load, so there is room for improvement in the judgment.

In the system in which the crane is operated, it was not possible to confirm dangerous scenes, inefficient transport scenes, etc. after the fact. Therefore, the operator could not effectively improve the crane operation technique in light of the day-to-day operation.

There are not a few cases where the same suspended load is transported repeatedly on a daily basis by a crane. However, in light of such circumstances, not much consideration has been given to measures such as measures to improve transportation efficiency.

Conventionally, cranes are used only for transporting suspended loads, and not much consideration has been given to further applications. In particular, the possibility of taking advantage of the crane being mounted at a high altitude has not been considered.

Conventionally, when lifting a suspended load by hooking a wire attached to a suspended load to a hook of a crane, it is difficult to accurately lift the center of gravity, and there is often a slight deviation between the position of the hook and the center of gravity. Therefore, conventionally, due to this deviation, the suspended load may move left and right or back and forth at the moment when the lift-off, that is, the suspended load leaves the floor, and there is a danger such as colliding with a operator who was working in the vicinity of the suspended load.

These challenges were not necessarily limited to cranes installed in facilities, but were common to cranes of the type that moved within a specified area.

An object of the present invention is to provide a technique for processing information acquired during crane operation in order to increase the usefulness of a crane moving within a specified area in various respects described above.

One embodiment of the present invention provides an operation results database that identifies the positional relationship between the suspended load and people or obstacles around it during operation of the crane and stores the positional relationship, and a danger level evaluation unit that performs the judgement about the presence or absence of danger, or the degree thereof regarding the operation of the crane based on the operation results database.

According to this embodiment, it is possible to determine the presence or absence of danger or the extent thereof, based on the positional relationship. The positional relationship can be obtained in various ways. For example, a device capable of acquiring a three-dimensional point cloud such as a camera or laser radar capable of photographing downward may be attached to the lifting device, and the positional relationship may be obtained by analyzing the captured image or the three-dimensional point cloud. The positional relationship may include the distance between the suspended load and the surrounding people or obstacles, the direction of a person or the like based on the movement direction of the suspended load, and the like. Further, these positional relationships may be acquired as static information at a certain point in time, or may be acquired as dynamic information such as changes in positional relationships over a certain period of time. When acquiring it as dynamic information, for example, it is possible to grasp a series of work procedures such as an operator approaching the suspended load, making contact for a certain period, and then leaving.

The method for determining the presence or absence of danger or the extent thereof may be used either a method using machine learning or a method not by machine learning as described later. A method that does not rely on machine learning may determine it dangerous when it is in a predetermined position relationship with the suspended load, or predict the possibility that danger will occur by statistical processing of the past positional relationship and the occurrence of an accident.

The "danger" is not necessarily limited to collisions between suspended loads and people or obstacles. For example, it includes the fall of a suspended load and the abnormal behavior of a suspended load. The determination of these hazards can be determined, for example, based on the positional relationship between the suspended load and the wire, whether the wire has been attached to the suspended load by a predetermined procedure, and the like.

In this embodiment, the danger level evaluation unit divides the transportation of the suspended load into a predetermined plurality of scenes, changes the data and method used for each scene, and performs the judgement.

Transporting the suspended load with a crane is divided into several scenes, such as attaching the wire to the suspended load, lifting, starting to transport, unloading, and removing the wire. Since the actual work is different in each scene, it is preferable to change the criteria for judging the danger. According to the above embodiment, by changing the data and method to be used for each of these scenes, it is possible to make a judgment with high accuracy. Note that the above-described scenes are only example and may be omitted in part or further divided into more scenes.

In this embodiment, the information processing apparatus includes a basic operation judgment unit that determines whether or not the operator involved in the transportation of the suspended load has performed a predetermined basic operation. The danger level evaluation unit performs the judgement in consideration of the degree of implementation of the basic operation.

In the handling of the crane, there are inspections and other basic operations that should be performed to suppress the danger. If these basic operations are neglected, the possibility of danger increases, if not necessarily caused. From this point of view, in the above embodiment, by using the degree of implementation of the basic operation, it is determined that the possibility of occurrence of danger is determined.

The judgement whether or not following the basic operation can be performed by various methods. As described later, machine learning may be used. For example, if it is an operation such as pointing confirmation, it may be determined based on images or the like whether or not the operator has taken a posture characteristic of the basic operation. In addition, if it can be confirmed that the operator is in contact with the suspended load for a certain period, it may be judged that a predetermined inspection of the suspended load has been performed based on that.

In this embodiment, the danger level evaluation unit performs the judgement about the presence or absence of the danger, or the degree thereof using a learning model for judgement obtained by machine learning based on the past operation results of the crane.

The presence or absence of danger and the extent thereof are not determined by a single element among various operation results, such as the positional relationship with the suspended load, but can be affected by the interaction of multiple elements. According to the above embodiment, by using the learning model obtained by machine learning, it is possible to make judgments including such interactions, and to improve the judgment accuracy of the presence or absence of danger and the extent thereof.

Various methods of generation of the learning model can be taken as described later. The operation results used to determine the danger and to generate the learning model may be different. That is, a learning model may be generated based on a separately prepared operation results and applied to an information processing apparatus. In addition, a function to re-learn the learning model reflecting the operation results obtained by the operation of the crane may be incorporated.

In this embodiment, the danger level evaluation unit further identifies the reason for the judgement about the presence or absence of the danger, or the degree thereof. This makes it easier to identify the cause of the risk that has been judged. The determination of the reason can be made in various ways. For example, when judging a danger without using machine learning, the cause of the dangerous may be identified in accordance with the judgment criteria used for the judgment. For example, when five judgment criteria A, B, C, D, and E are prepared, and when it is judged to be dangerous by the judgment criterion A using the distance between the suspended load and the person as a standard, the element corresponding to the judgment criterion A, that is, "the distance from the suspended load is closer than the reference value" etc. is determined as the "reason".

On the other hand, when determining danger using machine learning, the operation results data used for the learning model may be shown as a reason. In addition, when a model that is easy to track the judgment process is used, such as a decision tree, as a learning model, the reason may be obtained based on the node whose direction judged to be dangerous is selected in the judgment process.

In accordance with one embodiment the information processing apparatus comprises (a) a position detection unit for detecting the horizontal position information of the lifting device installed horizontally movably, wherein the operation results database stores the position information in time series, and (b) a display control unit that reads out the position information from the operation results database, displays the movement trajectory of the lifting device, and displays the judgment result by the danger level evaluation unit in association with a position on the moving trajectory.

By the above embodiment, it is possible to visually recognize at which position in the movement trajectory the danger has occurred. In addition, since the location can be identified, it becomes easier to grasp the reason why it was judged to be dangerous.

In this embodiment, the information processing apparatus may further include (c) a camera that moves with the lifting device and takes an image under the lifting device, and (d) an image database that stores image data taken by the camera in time series, wherein the display control unit displays images taken at a position on the movement trajectory in addition to the movement trajectory.

The above embodiment makes it possible to confirm the image at the time when it is judged to be dangerous. Therefore, it becomes easier to grasp the reason why it was judged to be dangerous.

In accordance with one embodiment, the information processing apparatus comprises a basic operation database that stores image data representing the basic operation that should be performed when operating the lifting device. In this embodiment, the danger level evaluation unit selects the basic operation that should be performed from the basic operation database, in case it judges the presence of danger, and the display control unit displays an image representing the selected basic operation using the basic operation database.

By doing this, it is possible to present the basic operation that should be taken originally. As a result, the operator can easily understand how the danger can be avoided.

In accordance with one embodiment, when using a learning model, the present invention can also be configured as a system for generating a learning model for determining whether or not a basic operation for operating a crane for moving a suspended load is performed within a specified area. The system comprises (a) a basic operation database that stores training data representing the basic operation to be performed, and (b) a learning model generation unit for generating a learning model for determining whether or not the basic operation is performed, based on the training data.

According to the above embodiment, a learning model can be generated based on the training data in which the basic operation has been performed in advance. This learning model should handle classification problems for determining so that it determines whether or not the actual operation corresponds to the basic operation. As the training data, it can be prepared as a set of still images representing the basic operation. Further, it is preferable to make an image in which only the operation of the operator is extracted. Since the actual judgment is made based on an image taken with a camera or the like attached to a lifting device, it is preferable to use image data taken under the same conditions as the training data.

The learning model used for determining danger in this embodiment may be generated by a learning model generation system for generating a learning model for determining the presence or absence of danger and/or the degree thereof, during the operation of a crane that moves a suspended load within a specified area. The system comprises (a) an operation results database that stores the past operation results of the crane, (b) a learning data generation unit that reads the operation results database, divides the transportation of the suspended load into a predetermined plurality of scenes, performs predetermined processing for each scene, and generates learning data, and (c) a danger level determination model generation unit that generates a learning model for determining the presence or absence and/or the danger level for each scene by machine learning using the learning data.

According to the above embodiment, the transportation of the suspended load is divided into various scenes, and a learning model for judging the danger for each scene can be generated. Generating a learning model divided into scenes in this way makes the accuracy improved. Since the learning model is generated separately for each scene, the operation results used for it may also be prepared for each scene.

With regard to the generation of the learning model, supervised learning can be used if sufficient results of operation in which dangers have occurred in the past have been obtained. Unsupervised learning is also useful. It is thought that most of the crane operation results will be data under normal operation without danger. Therefore, if a learning model for determining a cluster of data indicating normal operation without danger is generated by unsupervised learning, and if an operation results that tends to deviate from this cluster is obtained, it is considered to mean that abnormalities are occurring. This makes it possible to determine the presence or absence of danger and the extent thereof.

One embodiment of the present invention provides an information processing apparatus for processing information on the operation of a crane that moves a suspended load within a specified area. The information processing apparatus comprises (a) an input unit for inputting the position information of the departure and arrival point of a lifting device installed horizontally movably for lifting the suspended load in the crane, and (b) an optimal route setting unit that connects the departure and arrival points and obtains an optimal route for which a predetermined evaluation is optimal.

Conventionally, a crane often ran through a route that can keep sufficient room for the suspended load against surrounding obstacles, a route that makes it easy to transport the suspended load, and the like. On the other hand, according to this embodiment, since the optimal path can be obtained, the operating efficiency of the crane can be improved. In this embodiment, various “evaluations” for obtaining the optimal path can be considered. For example, the evaluation may be higher as the traveling distance of the lifting device is shortened. Or the evaluation may be higher as the number of times the lifting device changes the moving direction is small.

The method for obtaining the optimal path may be either a machine learning or a analytical method without machine learning. When machine learning is used, reinforcement learning with a predetermined “evaluation” as a reward can be used. This embodiment may obtain the optimal path based on the past movement trajectory of the crane. Furthermore, the optimum path may be set at the planning stage before operating the crane.

In accordance with this embodiment, the optimal route setting unit is an information processing apparatus for obtaining the optimal path in consideration of constraints set in advance for the movement of the lifting device, whereby a practical optimal path can be obtained.

Such constraint includes, for example, the ability to move equipment and obstacles in the facility where the crane is installed. This makes it possible to avoid that a path impossible the equipment or the like to move is output as an optimal route. Consideration of obstacles and the like may be changed depending on the presence or absence of a suspended load. For example, during the transportation of the suspended load, the optimal route is obtained so that the suspended load itself does not collide with facilities and obstacles, and in the state of the empty load, the suspended load device moves near the ceiling, so that equipment having a low height can be ignored and the optimal route can be obtained.

According to one embodiment, the optimal route setting unit is an information processing apparatus that considers the position of the passage of the operator operating the lifting device as the constraint. There is a certain type of cranes which the operator with a controller in his hand and moving with the lifting device to operate. In such a type, the lifting device cannot move far from the position of the operator’s passage. The above embodiment makes it possible to obtain a practical optimal path by considering the passage of the operator.

According to one embodiment, the optimal route setting unit considers as a constraint that the movement direction of the hanging device is limited to a predetermined direction set in advance. Some cranes have only four operation buttons like east, west, north and south. Even if these operation buttons are combined and operated, such a crane can only move in eight directions. The above embodiment can obtain an optimal path by considering the restriction of the crane travel direction in this way.

According one embodiment, the information processing apparatus further comprises an operation results database which stores the horizontal position of the lifting device installed horizontally movably for lifting the suspended load in a time series, wherein the optimal route setting unit calculates an index for evaluation with respect to each of the movement trajectory of the lifting device and the optimal path accumulated in the operation results database.

This makes it possible to evaluate how much optimization has been achieved by the optimal path. For example, in case of “evaluating” that the travel distance of the lifting device is shortened, an index such as a ratio or difference may be calculated based on the travel distance between the previous route and the optimized path. Various indicators can be set according to the content of the "evaluation".

According to one embodiment, a display control unit displays the movement trajectory of the lifting device accumulated in the operation results database and the optimal path in contrast. In this embodiment, both paths can be visually compared, which makes it possible to intuitively recognize the effect of optimization. In the above embodiment, it is desirable to change the display style between the conventional movement route and the optimal route for easy comparison.

Furthermore, in accordance with the display of the optimal route, equipment, obstacles, operator passages, and the like considered as constraint conditions may be displayed. This makes it easier to understand why the optimal route was selected.

One embodiment of the present invention provides an information processing apparatus for processing information acquired during the operation of a crane that moves a suspended load within a specified area. The information processing apparatus comprises (a) an operation results database that stores at least one of the presence or absence of danger and/or the degree thereof during the operation of the crane and at least one of the operation efficiency of the crane in time series as the operation results of the crane, and (b) a display control unit that displays the operation result in a manner which can identify a time when the danger level becomes a predetermined or greater, or a time when the operation efficiency is predetermined or less.

According to this embodiment, it is possible to provide matters to be improved in the operation of the crane. That is, in this embodiment, the operator easily recognize when the danger level becomes higher than a predetermined level or when the operation efficiency becomes lower than a predetermined level, and the operation at that time can be confirmed afterward. Thus, it is possible to relatively easily recognize what should be done to avoid danger and how to improve operation efficiency.

In this embodiment, the time of interest can be determined in various ways. For example, the timing when the danger level is high is determined as a timing when the "danger level", a probability of danger occurring, becomes higher than a predetermined value. The danger level may be set in advance according to the distance between the suspended load and the surroundings, the positional relationship, and the like. The operation efficiency can be calculated, for example, based on the ratio of the travel distance between the movement trajectory of the suspended load and the optimal path.

According to one embodiment, the display control unit displays a graph representing the time change of the operation result. This embodiment makes it easy to identify when the danger level is high or when the operation efficiency is low. In addition, the operator can review the, movement before and after that. In addition, the overall trend of whether the danger level, as a whole, tends to be high or whether it was dangerous only at a certain point in time can be seen. The same applies to operating efficiency.

According to one embodiment, an information processing apparatus comprises (a) a camera that moves with the lifting device, moving a suspended load and installed horizontally movable, and takes the image under the lifting device, (b) an image database that stores image data taken by the camera in time series, and (c) a display control unit that displays the image taken at each time point together with the operation results data. This makes it possible to confirm the image at the time when the danger level is high or the operation efficiency is low, and it is easy to find the reason.

In this embodiment, the display control unit associates those corresponding to similar cases among the operation results data, and performs the display in an aspect that can contrast the associated cases. By doing this, for example, similar cases can be contrasted, and points to be improved, the degree of improvement, and the like can be confirmed. "Similar" cases can be determined, for example, based on the type of suspended load, weight, movement trajectory, and the like.

According one embodiment of the invention, the layout of equipment and obstacles in the facility where the crane is installed can be optimized. In this embodiment, various "evaluations" for obtaining the optimal layout can be considered. For example, the evaluation may be high as the traveling distance of the lifting device is shortened. To minimize the transport route of the suspended load, a linear path connecting the departure and arrival points may be transported. If there are equipment or obstacles, which are not fixed, in the facility on this path, a layout that optimizes the transport path of the suspended load will be obtained. When the optimal layout is determined, the departure and landing place of the suspended load itself may also be changed. If a place is secured so that frequently transported suspended loads can be placed nearby, a layout that is optimal for the transportation route will be obtained. When there is a plurality of hanging loads, these elements may be comprehensively considered to obtain an optimal layout.

The method for obtaining the optimal layout may be either a method using a machine learning or a method obtained analytically without machine learning. When machine learning is used, reinforcement learning with a predetermined "evaluation" as a reward can be used.

In this embodiment, the layout optimization unit may obtain the layout in consideration of preset constraints on the movement of the equipment.

Some facilities are movable and some are not. In addition, in factories and the like, to realize efficient processing, it may be necessary to arrange certain equipment close each other. In this way, there are various constraints on the arrangement of equipment. In the above embodiment, a practical layout can be sought to take these constraints into account.

In this embodiment, the operation results database stores a transportation route for a plurality of suspended loads, and the layout optimization unit obtains the layout so that the sum of the transportation paths for the plurality of suspended loads is the shortest.

As explained above, "evaluation" of whether the layout is optimal or not can be performed based on various criteria. The above embodiment corresponds to the case where evaluation is based on the travel distance of the lifting device. Since shortening the moving distance also leads to a shortening of the carrying time of the suspended load and reducing the burden of the information processing apparatus, an optimal layout effective in many aspects can be obtained according to the above embodiment.

In this embodiment, the layout optimization unit obtains the layout, by attempting the improvement by changing the departure and arrival point of the suspended load, and thereafter, attempting the improvement by moving the equipment. In addition, analytical method can be applied to obtain the optimal layout. The above embodiment is one method thereof.

To obtain the optimal layout, two elements are considered: changing the departure and landing point of the suspended load and moving the equipment, etc. In the above embodiment, among these two elements, priority is given to changing the departure and arrival point of the suspended load because this changing has a higher degree of freedom. Thus, it is possible to obtain an optimal layout that is easy to move from the current layout.

In this embodiment, the layout optimization unit may obtain the layout by reinforcement learning that rewards the predetermined evaluation. That is, the reinforcement learning, which is one of the machine learning, may be used to obtain the optimal layout. The reinforcement learning in the above embodiment optimizes the layout so that a high "evaluation" can be achieved. When the moving distance of the lifting device is used as the criterion for "evaluation", the layout is optimized so that the moving distance is shortened. By applying reinforcement learning in this way, it is possible to obtain a solution that could not be obtained by an analytical method, and there is a possibility that a more effective optimal layout can be obtained.

One embodiment of the present invention provides an information processing apparatus for processing information acquired during the operation of a crane that moves a suspended load within a specified area. The information processing apparatus comprises (a) a data acquisition unit, moving with a lifting device which lifts the suspended load and is installed horizontally movably, and acquiring data for specifying the positional relationship and posture between the suspended load and the people or obstacles around it, and (b) an accident determination unit that determines whether or not an accident has occurred based on the positional relationship and posture between the suspended load and the people or obstacles around it.

Crane accidents can occur due to various factors such as abnormal behavior of suspended loads and operator operation errors. In addition, when transporting a heavy load, an accident such as an operator being caught between the suspended load and the equipment or obstacle may occur. Moreover, if the crane is operated alone and an accident occurs, no one may notice it.

This embodiment makes it possible, by identifying the positional relationship or postures between the suspended load and the people or obstacles around it and determining the occurrence of the accident based on these, to promptly deal with the accident.

The positional relationship can be obtained in various ways. For example, a device capable of acquiring a three-dimensional point cloud such as a camera or laser radar capable of photographing downward may be attached to the lifting device, and the positional relationship may be obtained by analyzing the captured image or the three-dimensional point cloud. The positional relationship may include the distance between the suspended load and the surrounding people or obstacles, the direction of a person or the like based on the movement direction of the suspended load, and the like. Further, these positional relationships may be acquired as static information at a certain point in time, or may be acquired as dynamic information such as changes in positional relationships over a certain period of time. When acquiring it as dynamic information, for example, it is possible to grasp a series of work procedures such as an operator approaching the suspended load, making contact for a certain period, and then leaving.

The method determining the occurrence of an accident may use either a machine learning or a not machine learning as described later. As a method that does not rely on machine learning, a method determining an accident according to a predetermined position relationship or posture can be taken.

In this embodiment, considering the purpose of promptly responding to an accident, the error of judging that an accident occurs even though no accident has occurred is acceptable, but the error of judging that an accident has not occurred even though an accident really occurs should be avoided. Therefore, in the embodiment, it is preferable that the method for determining the occurrence of an accident emphasizes avoiding an error of judging that an accident has not occurred even though an accident really occurs. This can be improve the reliability of the system.

When an accident is determined, various reporting operations may be performed. For example, a mode in which an accident has occurred is notified to the surrounding operators by a loud alarm sound or an alarm lamp, a mode in which an accident occurrence e-mail is sent using a preset address or the like, and the like.

In this embodiment, the accident determination unit may determine that an accident has occurred when it detects the appearance of a person who has fallen within a predetermined range from the suspended load.

A situation in which a person lies down near a suspended load is generally likely to be an accident. When acquiring a downward image or the like with a camera attached to a lifting device, a laser radar, or the like, it is easy to distinguish between a standing person and a person who is lying down with relatively high accuracy. Therefore, according to the above embodiment, accidents can be detected with high accuracy.

In accordance with one embodiment, the information processing apparatus comprises an operation results database that stores data for identifying the positional relationship and posture between the suspended load and the people or obstacles around it as an operation results, and the accident determination unit determines the occurrence of an accident using a learning model obtained by unsupervised machine learning based on the operation results database.

The occurrence of an accident is rarely judged by a single factor such as the positional relationship between the load and the operator and the posture of the operator, but in many cases, it is considered that it can be determined by comprehensively considering multiple factors. According to the above embodiment, using a learning model obtained by machine learning makes it possible to make a judgment by comprehensively considering these multiple elements, and to improve the judgment accuracy.

Various methods of generation of the learning model can be taken as described later. The operation results used to determine the occurrence of an accident may be different from those used for generating the learning model. That is, a learning model may be generated based on a separately prepared operation results and applied to an information processing apparatus.

In accordance with one embodiment, the accident determination unit notifies the preset recipient when it is judged that an accident has occurred. The method for the notification may be a way of sending an e-mail to a preset address, or a way of calling a preset telephone number, notifying the occurrence of an accident by automatic voice. This can shorten the response to accidents. In addition, even if there is no person in the place where the crane is installed, it is possible to deal with the accident.

In accordance with one embodiment, the information processing apparatus comprises (a) a camera that moves with the lifting device and takes image under the suspended load, (b) an image database that stores image data taken by the camera in time series, and (c) an image-in-hazard provision unit that associates and stores, in case judging that the accident has occurred, the time when the accident occurs and the image data, and outputs the associated image data upon request.

According to the above embodiment, it is possible to easily confirm the situation when an accident occurs with an image. In the above embodiment, the image data at the time of the accident may be stored separately from the image database. Further, information specifying the image data at the time of the accident may be stored in the image database, such as storing the time information at the time of occurrence. In this case, the identified image data may be read from the image database and output. In this embodiment, the output includes both display and providing the image data.

When utilizing a learning model, the present invention can also be configured as a system for generating a learning model. In accordance with one embodiment, a learning model generation system generates a learning model for determining the occurrence of an accident during the operation of a crane that moves a suspended load within a specified area. The system comprises (a) an operation results database that stores data for identifying the positional relationship and posture between the suspended load and the people or obstacles around it as an operation results, and (b) an accident determination model generation unit that generates a learning model for determining the occurrence of an accident by performing cluster analysis based on the operation results database.

The operation results of cranes consider to be data under normal operation without any accident. Therefore, unsupervised learning generates a learning model that determines a cluster of data indicating normal operation, and if the positional relationship and posture between the suspended load and the people or obstacles around it are out of this cluster, it is considered to mean that there is a high possibility of accident. Therefore, it is possible to determine the occurrence of an accident.

In accordance with one embodiment of the present invention, the information processing apparatus comprises (a) a data acquisition unit, moving with a lifting device which lifts the suspended load and is installed horizontally movably, and acquiring at least one of an image, an infrared ray, and a three-dimensional point cloud, and (b) a security operation unit that drives the lifting device with a preset scanning pattern, determines the presence or absence of an abnormality based on the data acquired by the data acquisition unit during the drive, and executes a preset security operation when an abnormality occurs.

According to this embodiment, the crane can be used for an application of abnormality detection other than simply for the transportation of suspended loads. Since the crane is a device that moves upwards and can widely monitor the facility, the application is highly useful.

The scan pattern described above refers to a preset movement trajectory so that the facility can be uniformly monitored. This scanning pattern can be realized by preparing a control device that outputs a control signal so as to move according to such a scanning pattern to the motors of the lifting device.

In this embodiment, the data acquisition unit may be provided according to the type of abnormality to be discovered. A camera can be used for acquiring images. An infrared camera or an infrared sensor can be used for acquiring infrared rays. As a device for obtaining a three-dimensional point cloud, a laser radar can be used.

The security operation in this embodiment may take various operations, such as generating an alarm sound or sending an email to a predetermined address. In this embodiment, the security operation unit may change the scanning pattern of the lifting device, in case discovering the abnormality.

Before discovering abnormalities, it is preferable to adopt a scanning pattern that can evenly monitor the facility. However, if this scanning pattern is continued even after the abnormality is discovered, there is a possibility that sufficient information on the abnormality may not be obtained. According to the above embodiment, since the scanning pattern is changed after abnormality discovery, the usefulness at the time of abnormality discovery can be improved.

In accordance with one embodiment, the security operation unit may determine whether or not a fire has occurred, based on the image or infrared rays, and moves the lifting device to the place where the fire occurs when it is judged that a fire has occurred. In the event of a fire, flames and smoke are generated. By comparing the captured image with the image in normal states, if an area where visibility is deteriorated due to flame or smoke or a region containing a color spectrum peculiar to flames is found, it can be judged that a fire has occurred. Further, if a high-heat portion can be detected by infrared rays, it can be judged that a fire has occurred. Both images and infrared rays may be used.

In the above embodiment, when a fire has occurred, the lifting device is moved to the place of the fire. Therefore, it is possible to continuously monitor the situation of the fire. If the judgement of a fire occurrence is determined an error, it may be returned to the initial scanning pattern.

In accordance with one embodiment, the security operation unit may determine the presence or absence of a person based on the data acquired by the data acquisition unit, and moves the lifting device to the entrance and exit of a facility equipped with the lifting device when it is judged that there is a person. This embodiment assumes that it is operated when there is no person, such as after the end of work at the facility. The presence or absence of a person can be judged in various ways. Judgment may be made based on an image or a three-dimensional point cloud. It may be judged by infrared rays.

When the crane finds a person, it is preferable that the system can follow the person enough. However, in general, the moving speed of the lifting device is not as fast as the running speed of the person, so it is difficult to completely follow the person. Therefore, in the above embodiment, when the presence of a person is detected, the lifting device is moved to the doorway. The person is considered to try to exit from the doorway, moving the lifting device to the doorway is possible to take the picture of the person at the time of exit.

When there is a plurality of doorways, the lifting device may be moved so as to sequentially patrol among these doorways. Further, it may be preferentially moved to the doorway closest to the position of the detected person.

In accordance with on embodiment, the information processing apparatus comprises (a) a camera that moves with the lifting device and takes image under the suspended load, (b) an image database that stores image data taken by the camera in time series, and (c) an image-in-hazard provision unit that associates and stores, in case judging that the accident has occurred, the time when the accident occurs and the image data, and outputs the associated image data upon request.

According to the above embodiment, it is possible to easily confirm the situation when an abnormality is discovered with an image. The provision of image data is the same as described in the embodiment.

One embodiment of the present invention provides an information processing apparatus for processing information acquired during the operation of a crane that moves a suspended load within a specified area. The information processing apparatus comprising (a) a position detection unit for detecting the horizontal position information of a lifting device for lifting the suspended load and installed horizontally movable, and (b) a lift off safety support unit for supporting safety at the time of lift off. The lift off safety support unit registers the position information of the lifting device when the suspended load is grounded, and moves the lifting device so as to match the registered position information when the suspended load is transported again.

According to this embodiment, as described below, at the moment of the lift-off where the suspended load leaves the floor, the lifting point is slightly off the center of gravity, so that the risk that the suspended load swings left and right or back and forth can be suppressed.

In this embodiment, when the suspended load is landed, the position information of the lifting device is registered in conjunction with the suspended load. At the time of landing, since the lifting device is in a state of accurately lifting on the center of gravity of the suspended load, if the positional relationship between the lifting device and the suspended load at this time can be accurately reproduced, it should be possible to accurately lift the center of gravity the next time when the same load is lifted again. According to this idea, in this embodiment, when the suspended load is transported again, the lifting device is moved so as to match the registered position information. In this movement, for example, the registered position information may be read out and the lifting device may be moved to that position, or the operator may visually move it to the vicinity of the suspended load or the like, and the position of the lifting device may be corrected based on the registered position information.

Using the position information at the time of landing in this way, it is possible to reproduce the positional relationship between the lifting device and the suspended load at the time of landing, and it is possible to suppress the vibration of the suspended load at the time of lifting-off.

In this embodiment, additional elements may be added in order to accurately lift the center of gravity of the suspended load. For example, a wire is usually attached to the suspended load, and this is often hooked to the hook of the crane and lifted, but strictly speaking, depending on how the wire is hooked to the hook, a gap between the lifting position and the center of gravity position of the suspended load is possibly generated. To avoid this, a device may be applied to reproduce the attachment position of the wire to the suspended load and the order in which the wires are hooked to the hook. For example, a number or other identification mark may be attached or written at the attachment position of each wire of the suspended load, and the wires may be hooked to the hook in the order specified by the identification mark.

In another aspect, laser irradiation may be performed on the suspended load from the crane side. Markers corresponding to the spots that are irradiated by the laser are attached to the top surface of the suspended load at the time of landing, or marks are drawn on the upper surface of the hanging. In this way, the next time the suspended load is lifted, if the position of the lifting device is adjusted so that the spot of laser irradiation matches this marker or mark, it is possible to reproduce an appropriate positional relationship with more accuracy.

In this embodiment, the lift off safety support unit performs the registration when the hoisting of the lifting device is started after the suspended load is grounded and the wire is detached from the suspended load. By doing this, it is possible to accurately store the position information at the time of landing without requiring special operation. Of course, regardless of the above-described aspects, it is not a problem to take a mode of registering position information by operation of a operator.

In this embodiment, the lift off safety support unit may delete the registered position information when the suspended load is lifted again. The position information at the time of landing is registered in order to reproduce the positional relationship between the lifting device and the suspended load that has been landed, and this position information is not useful for reproducing the positional relationship unless it is used for the same suspended load. That is, when the suspended load that has been landed is lifted again, the registered location information is useless. In addition, if such unnecessary position information is used incorrectly, it may not be possible to accurately lift on the center of gravity of the suspended load, which may cause danger.

In the above embodiment, the position information that has become useless can be deleted. Thus, it is possible to suppress the storage capacity for holding unnecessary position information, and to suppress the risk that useless position information is used by mistake.

In the above embodiment, the deletion of the registered position information may be performed, for example, based on the operation of the operator. Further, the presence or absence of a suspended load is detected by a method for detecting the load of the lifting device, a method for analyzing the photographed image of a camera attached to the lifting device, or the like, and when it is determined that the suspended load that has been landed has been lifted, the corresponding position information may be automatically deleted.

In accordance with one embodiment the information processing apparatus further includes a camera that moves with the lifting device and takes image under the suspended load, wherein the lift off safety support unit stores image data captured by the camera when the suspended load is grounded, and uses the image data to move the lifting device when the implanted suspended load is transported again. The image data can be used in a variety of aspects. For example, when the operator selects any of the registered position information to lift the suspended load that has been landed again, if image data is provided together with the position information, the error in selecting the position information can be suppressed.

In another embodiment, when lifting the suspended load with the lifting device, an image is taken with a camera and matched with the registered image data, so that the loading load is correct or false, and the presence or absence of a position shift between the suspended load and the lifting device can be detected. In this way, the reproducibility accuracy of the positional relationship between the suspended load and the lifting device can be further improved.

In this embodiment, the lift off safety support unit, in case of receiving a lowering instruction to the lifting device in a state where the suspended load is not suspended, corrects the position of the lifting device based on the registered position information within a predetermined range from the lifting device at that time.

In the above embodiment, when an operator visually moves the lifting device to the vicinity of the suspended load where it is landed and gives instructions for winding, the position of the lifting device is automatically corrected to the position registered corresponding to the suspended load. This makes it possible to save the trouble of selecting the registered position information by the operator. In addition, the risk of selecting an incorrect location information can be suppressed.

The present invention does not necessarily need to include all of the above-described features, and may optionally omit or combine portions thereof. Furthermore, various information processing realized in the above-described information processing apparatus may be configured as an information processing method executed by a computer, or such a method may be configured as a computer program for performing a computer. In addition, the computer on which the computer program is recorded may be configured as a readable recording medium.

DETAILED DESCRIPTION OF EMBODIMENTS OF THE INVENTION

Examples of the present invention will be described with the example of an overhead crane for transporting heavy objects in a factory or warehouse. The present invention can be constructed as a variety of information processing apparatus not limited to this example, and can also be configured as a care crane for transporting a person to be cared for, for example. The place where the information processing device is installed is not limited to indoors. Further, the present invention is applicable not only to those that move using a fixed traveling rail such as an overhead crane as long as it is an information processing apparatus for moving a suspended load within a specified area.

Examples will be described in the following order.

A. System Embodiment:
B. Hazard assessment function:
C. Optimal routing function:
D. Operation diagnosis function:
E. Layout optimization function:
F. Accident detection function:
G. Security function:
H. Lift-off safety support function:
I. Effects and modifications:

A. System Embodiment

Figure 1:
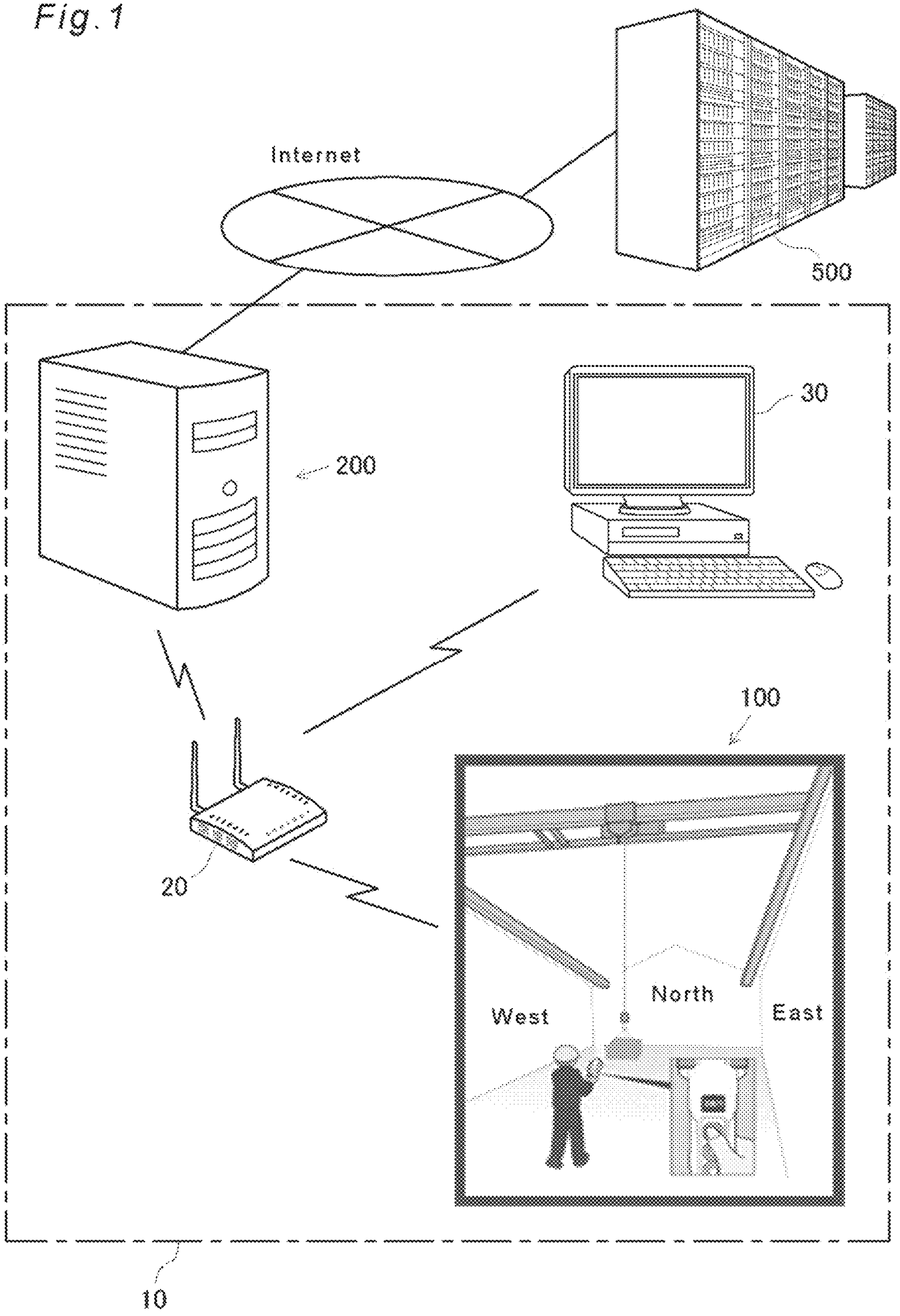
FIG. 1 is an explanatory diagram showing the embodiment of the information processing apparatus.

FIG. 1 is an explanatory diagram showing the embodiment of the information processing apparatus. The overhead crane 100 is a device that moves on a traveling rail installed in a factory according to the operation of an operator to transport a heavy object. Its structure will be described later.

The overhead crane 100 is connected to the information processing apparatus 200 via the wireless LAN 20. The information processing apparatus 200 is built by a server as hardware, and various information is acquired and stored in the information processing apparatus 200 during the operation of the overhead crane 100. The information processing apparatus 200 performs functions such as analyzing these information and controlling the operation of the overhead crane 100.

In addition to this, a computer 30 as a terminal is connected to the wireless LAN 20. The computer 30 is used for viewing data and analysis results accumulated in the information processing apparatus 200, operation instructions for the overhead crane 100, and the like. In addition to the computer 30, a tablet, a smartphone, or the like may be used as a terminal.

The information processing apparatus 200 is connected to the learning model generation system 500 via the Internet. The learning model generation system 500 is built by a server connected to the Internet as hardware, and plays a role in generating machine learning models used by the information processing apparatus 200 when realizing various functions.

In the embodiment, the learning model generation system 500 is constructed as a separate system from the information processing apparatus 200 in this way, but both may be installed in the same facility, or the learning model generation system 500 may be incorporated into the information processing apparatus 200 and configured as an integrated system.

Conversely, some or all of the various functions of the information processing apparatus 200 described later may be provided by an external server connected via the Internet. In this sense, the information processing apparatus 200 is not necessarily limited to a system composed only of one factory premises.

Figure 2:
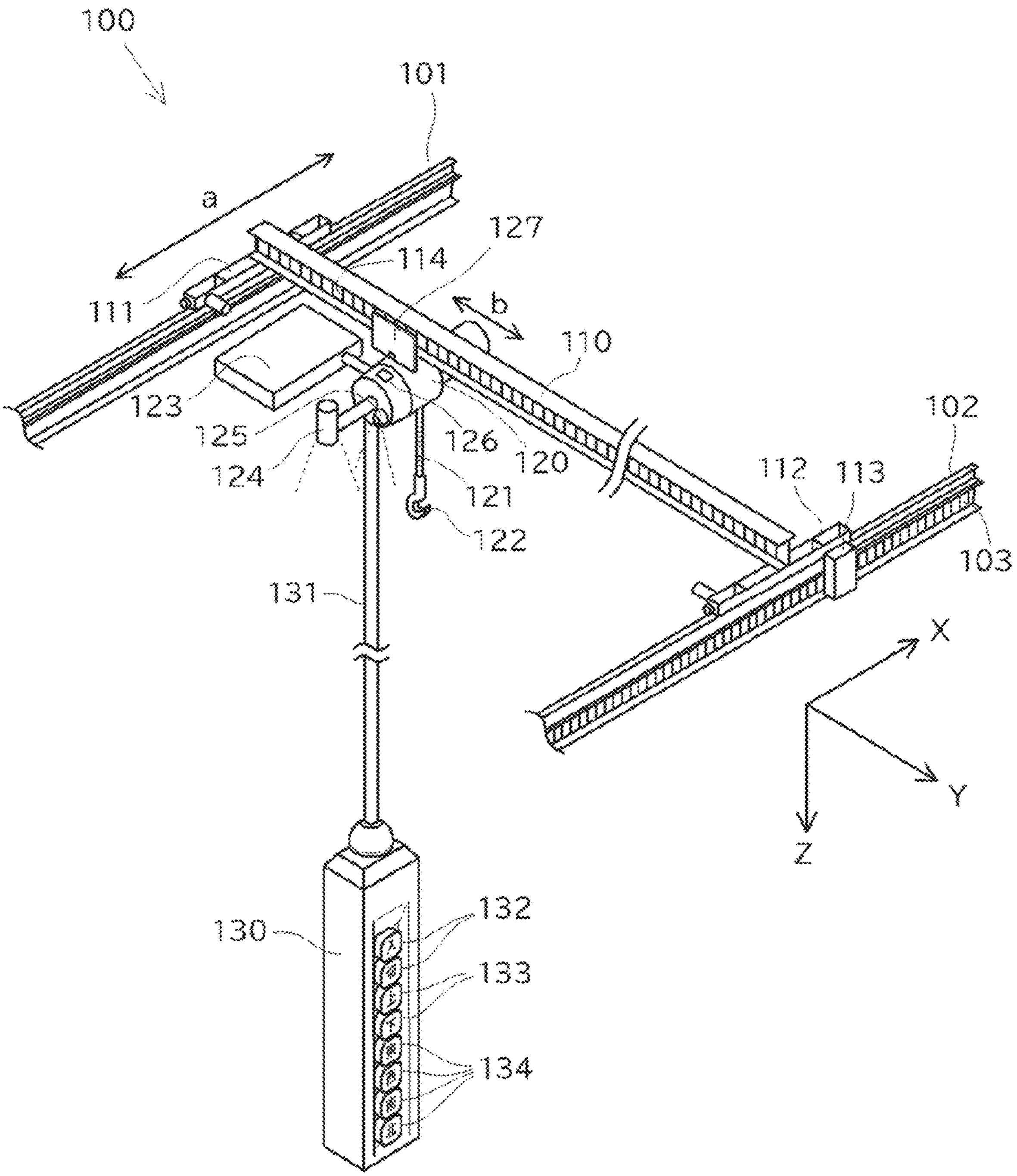
FIG. 2 is an explanatory drawing showing the structure of the overhead crane 100.

FIG. 2 is an explanatory diagram showing the structure of the overhead crane 100. The overhead crane 100 is provided with a hoist 120 that corresponds to a lifting device for transporting a suspended load. The hoist 120 can lift-up/down the suspended load by winding-up and winding-down the wire 121 to which a hook 122 for hooking the suspended load is attached to the tip.

Operations of the hoist 120 like winding-up/winding-down of the wire 121, moving and the like can be controlled by a controller 130 connected by a cable 131. An enlarged view of the controller 130 is shown in the lower left area of the figure. As shown, the controller 130 is provided with a pushbutton 132 for power on and off, pushbuttons 133 for winding-up/winding-down the wire 121, and four pushbuttons 134 for moving in four directions, to east, to west, to north and to south. In the embodiment, the controller 130 is not limited to such schemes. For example, instead of the four pushbuttons 134, the controller itself may be rotated around the central axis of the cylindrical housing to indicate the movement direction of the hoist 120. The controller 130 may use a wireless one instead of a wired one connected by a cable 131.

A camera 124 is attached to the hoist 120. The camera 124 is for capturing moving images and is fixed downward so that vertical downward direction can be captured. A still camera for taking a still image may be used for the camera 124, instead. The captured image data is transmitted to the information processing apparatus 200 via the wireless LAN 20 described in FIG. 1.

The hoist 120 also has a laser radar 125. The laser radar 125 is a device that irradiates a laser from the main body and measures the distance to the person or object based on the time until it hits the surrounding person or object and reflects it. By scanning the laser within a certain range, the shape and distance of surrounding people and objects can be obtained in the form of a three-dimensional point cloud. In this embodiment, the laser radar 125 was mounted downward so as to obtain a three-dimensional point cloud below the hoist 120. The obtained three-dimensional point cloud is transmitted to the information processing apparatus 200 via the wireless LAN 20.

The hoist 120 has a display 123 attached to it facing downwards. A liquid crystal display is used in this embodiment, but an organic EL, an LED or other display or indicator can be used as the display 123. The display 123 displays useful information such as the movement direction of the hoist 120 to the operator or the like during the operation of the crane.

Although not shown in the figure, a camera to capture the screen of the display 123 may be further attached to the hoist 120. For example, by attaching the camera 124 for photographing the downward part of the camera 124 rotatable, the camera 124 is also usable as a camera to capture the display 123. By providing a camera to capture the display 123 in this way, it is possible to determine what is displayed and abnormalities of the display 123 according to the captured image, thereby preventing the failure of the display 123 and responding quickly to the failure.

The mechanism by which the hoist 120 moves is described below.

In the facility where the crane is installed, the running rails 101 and 102 are laid parallelly and horizontally near the ceiling of its building. Saddles 111 and 112 are attached on the running rails 101 and 102 so that they can travel like arrow a by motor power. The saddles 111 and 112 are fixed to the crane girder 110 straddling both. The crane girder 110 is provided in a horizontally and orthogonal to the traveling rails 101 and 102. When the saddles 111 and 112 move in the direction of the arrow a, the crane girder 110 can also move as an integral part therewith.

The hoist 120 is attached to the crane girder 110 so that it can be moved by a motor along the crane girder 110 in the direction of arrow b. Therefore, by combining the movement of the crane girder 110 in the direction of the arrow a and the movement of the hoist 120 in the direction of the arrow b, the hoist 120 can arbitrarily move the space between the traveling rails 101 and 102.

In this embodiment, a mechanism for detecting the position of the hoist 120 is provided. As shown, a marker 103 for detecting a position is drawn on the running rail 102. By optically reading the marker 103 by the sensor 113 fixed to the saddle 112, the amount of movement of the saddle 112, and thus the position of the saddle 112 in the a direction can be detected. Similarly, the crane girder 110 also depicts a marker 114 for position detection. When the hoist 120 is moving, the amount of movement of the hoist 120, and thus the position of the hoist 120 in the b direction can be detected by optically reading the marker 114 by the sensor 127 fixed to the hoist 120. As a result, based on the results read by the sensors 113 and 127, it is possible to detect the horizontal position coordinates (x, y) of the hoist 120. The position coordinates are transmitted to the information processing apparatus 200 via the wireless LAN 20.

Figure 3:
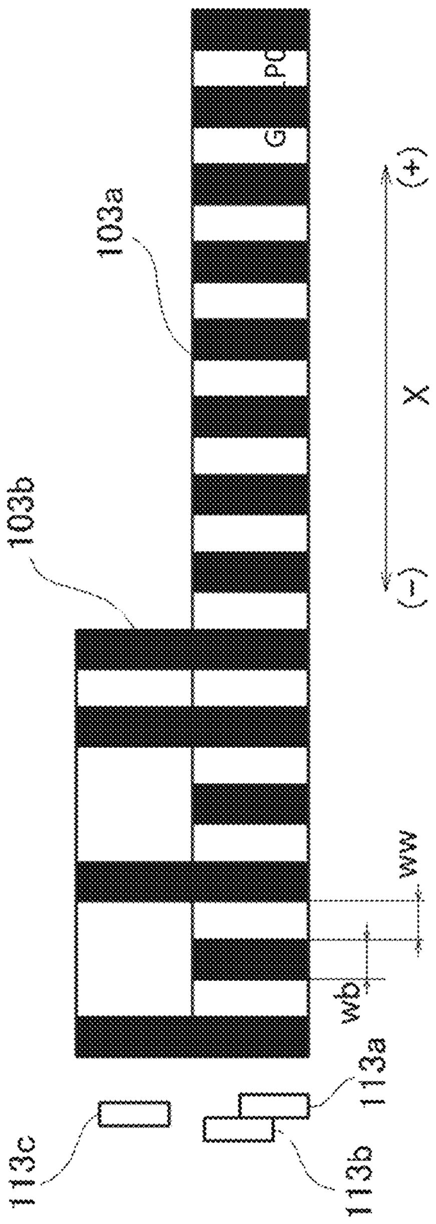
FIG. 3 is an explanatory diagram showing the embodiment of the position detection mechanism.

Details of the position detection mechanism is described. FIG. 3 is an explanatory diagram showing an embodiment of a position detection mechanism. On the running rail 102, a mechanism for detecting the position in the a direction of the saddle 112, that is, the X coordinate in FIG. 2, has been shown. In FIG. 3, it is assumed that the right direction is the positive direction of the X coordinate and the left direction is the negative direction. The origin can be set at any location.

In the position detection mechanism, the marker 103 described in FIG. 2 is depicted on the traveling rail 120. As specifically shown in FIG. 3, the marker 103 includes a position detection marker 103*a* and a coordinate detection marker 103*b*.

The position detection marker 103*a* alternately depicts white and black regions. The width wb of the black area is constant. Also, the width ww of the white area is also constant. Both wb and ww may be the same width or may be different. The position detection marker 103*a* is depicted throughout the traveling rail 120. In this embodiment, a tape depicting the pattern illustrated in advance was prepared and affixed to the running rail 120.

The coordinate detection marker 103*b* is a short marker drawn at an appropriate position on the traveling rail 120. It may be provided in one place of the running rail 120, or may be provided in a plurality of places. The coordinate detection marker 103*b* is formed in a white and black region, but the number and width are different for each location. That is, a single pattern composed of the number and width of white and black lines identically represents a specific position of the running rail 120.

The position detection mechanism includes optical sensors 113*a*, 113*b* for detecting the position detection marker 103*a* and the optical sensor 113*c* for detecting the coordinate detection marker 103*b*. The optical sensors 113*a* and 113*b* are installed at a staggered phase with respect to the traveling direction. Therefore, when moving to the right side, the optical sensor 113*a* detects a black and white pattern, and then the optical sensor 113*b* detects a black and white pattern with a slight delay. Conversely, when moving to the left side, the optical sensor 113*b* detects a black and white pattern, and then the optical sensor 113*a* detects a black and white pattern with a slight delay. Thus, depending on the time difference of detection by the optical sensors 113*a* and 113*b*, it is possible to determine whether it is moving to the right side or the left side.

A method for identifying the X coordinate of the hoist 120 by the position detection mechanism is as follows. When the hoist 120 is moving in the right direction, based on the number of black detections Nb and the number of white detections Nw by the optical sensor 113*a* or the optical sensor 113*b*, Nb×wb+Nw×ww is added to the previous coordinate value. When moving in the left direction, Nb×wb+Nw×ww is subtracted from the previous coordinate value.

In the present embodiment, since the optical sensors 113*a* and 113*b* are installed with phase differences, there are 4 states of the output of both, that is, (1) both optical sensor 113*a* and 113*b* are black, (2) the optical sensor 113*a* is black, the optical sensor 113*b* is white, (3) optical sensors 113*a* and 113*b* are both white, (4) the optical sensor 113*a* is white, and the light 113*b* is black, and these 4 states are periodically output within the wb+ww section. Therefore, according to these four outputs, the position identification can be a higher resolution than the width wb of the black area and the width ww of the white area.

When the signal of the coordinate detection marker 103*b* is detected, the pattern can be specified based on the number and width of the black and white regions, and the X coordinate value can be specified by referring to the pre-stored pattern information. Since the coordinate value calculated with the position detection marker 103*a* may include an error, when the coordinate value is specified by the coordinate detection marker 103*b*, the coordinate value calculated with the position detection marker 103*a* can be corrected by this value. This way can improve the accuracy of position detection.

Location information detection may be executed by other methods. For example, preparing a database storing the position of the equipment and the like in the facility in advance, obtaining the relative positional relationship with the equipment or the like through analyzing the lower image taken by the camera 124, and detecting the position coordinates of the camera 124 and the position coordinates of the hoist 120 may be executed. In this case, instead of equipment, a marker having a predetermined shape that is easy to detect may be used.

In another method, the laser radar 125 measuring the distance to the wall around the facility, thereby calculating the position relative to the wall by the measurement, and detecting the position coordinates of the hoist 120 can be taken. Instead of the laser radar 125, a laser ranging device for measuring the distance to the surroundings may be separately attached to the hoist 120.

If radio waves can be received well in the facility, it is also useful to use GPS in combination.

Figure 4:
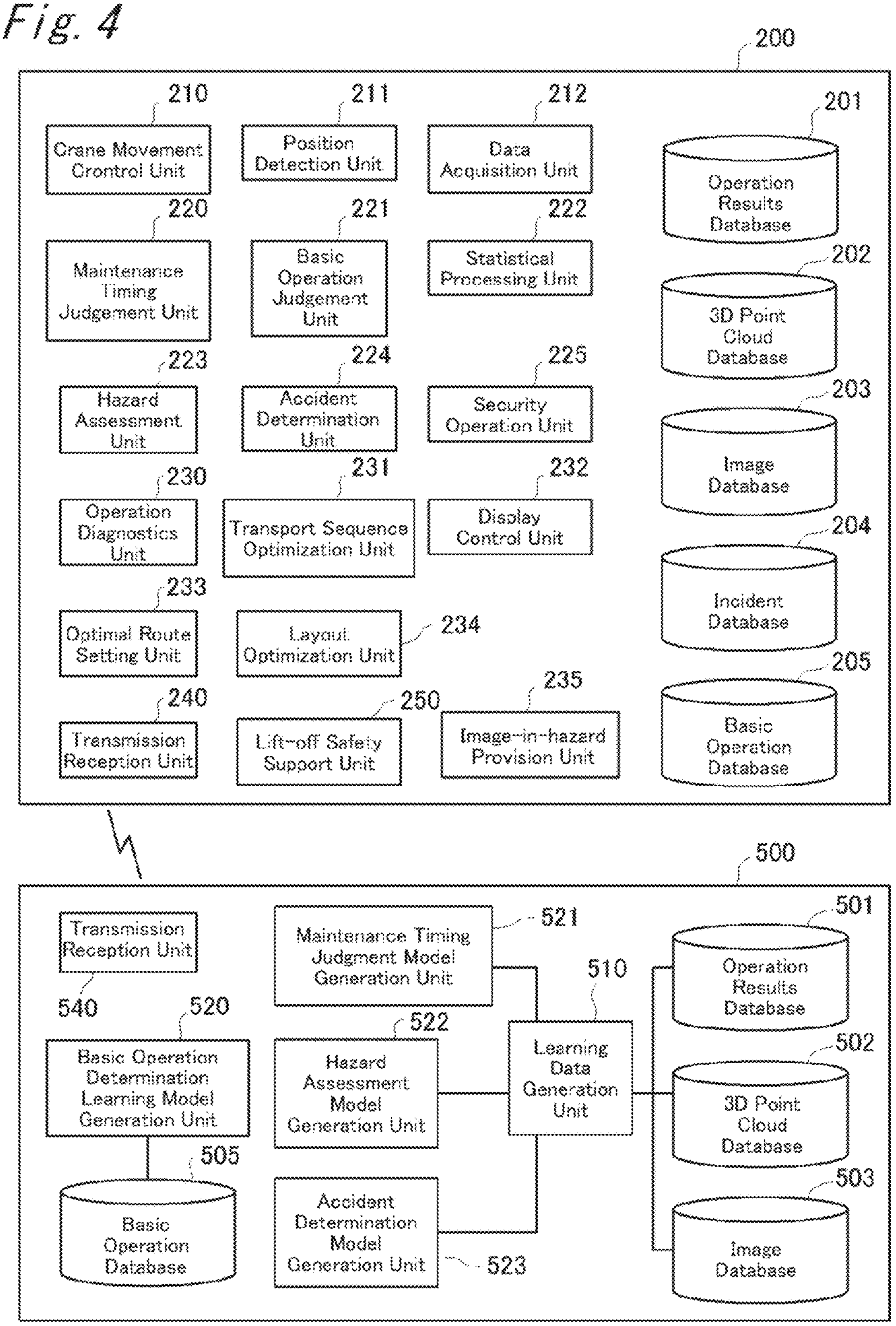
FIG. 4 is an explanatory diagram showing the embodiment of the information processing apparatus 200 and the learning model generation system 500.

FIG. 4 is an explanatory diagram showing the embodiment of the information processing apparatus 200 and the learning model generation system 500. The information processing apparatus 200 and the learning model generation system 500 are configured, as hardware, by a computer having a CPU and a memory, particularly a server, and each functional unit shown in the illustration is constructed in software. Some or all of these functional units may be built in hardware.

Hereinafter, each functional part is described. A functional unit of the information processing apparatus 200 will be described.

The operation results database 201 is a database storing various information during operation of the overhead crane 100. The data to be stored includes position coordinates of the hoist 120, operation data of the controller, working data such as the type of suspended load and the transport schedule, and the like. Position coordinates, operation data, and the like are stored in a time series by associating each data with the time information obtained. In this embodiment, the position coordinates and operation data are stored separately. A method of sequentially storing each time, position coordinates, and operation data as a set of data may be used. The advantage in this method is that the relationship between the position coordinates and the operation are easily collated, but for example, during the operation of lifting and downing the load, the same position coordinates are stored repeatedly even though the hoist 120 does not move, thus a wasteful amount of data is likely to occur. The data storage format may be selected by comprehensively considering such merits and demerits.

Hereinafter, data stored in the operation results database 201 may be collectively referred to as "operation result data".

The three-dimensional point cloud database 202 stores data of the three-dimensional point cloud obtained by the laser radar 125. The three-dimensional point cloud data is repeatedly acquired at predetermined time intervals and is stored in the three-dimensional point cloud database 202 in association with the acquired time.

The image database 203 stores image data obtained by the camera 124. In this embodiment, the image data is a moving image. Image data is also stored in a form in which each scene is correlated with the time.

The incident database 204 stores information that identifies the time and position coordinates when an abnormality is detected in the facility where the crane is installed, and the three-dimensional point cloud data and image data before and after that. As described later, the crane in this embodiment has a function of monitoring the facility in an unmanned state in addition to normal operation for transporting suspended loads. In addition, during normal operation, it has a function to determine whether or not an accident has occurred. "Abnormality" stored in the incident database 204 means an abnormality discovered by the surveillance, specifically a fire and a suspicious person, and also an accident. As described above, the incident database 204 stores information that identifies three-dimensional point cloud data and image data during periods of time before and after the occurrence of abnormalities. This means a path and other information for reading the corresponding data from the three-dimensional point cloud database 202 and the image database 203. By doing this, while suppressing the amount of data stored in the incident database 204, it is possible to easily output these data before and after the occurrence of abnormalities. Of course, there is no problem in copying the corresponding data from the three-dimensional point cloud database 202 and the image database 203 and storing it in the incident database 204.

The basic operation database 205 stores image data representing the basic operation to be performed by the operator during the operation of the crane. This data can be used to determine whether or not the operator performed these basic operations during operation. It can also be used to teach the operator the basic operation that should be performed originally. In this embodiment, in order to use the judgment, a moving image taken from the top to downward in the same manner as the camera 124 was used for the basic operation. As data for teaching the operator, an image taken from the front of a person may be prepared. Note that each image data is stored in conjunction with the name of the basic operation to be performed by the operator.

The crane movement control unit 210 performs a function of controlling the movement of the crane. In the normal operating state of the crane transporting the suspended load, the operator is mainly moved by the operation of the controller 130 (see FIG. 1). However, in this embodiment, in addition to this, the crane can move unmanned in the facility in a predetermined scanning pattern and monitor the presence or absence of abnormalities. The crane movement control unit 210 controls the movement of the crane for this monitoring. A scanning pattern, for example, is executed by main scanning, crane running in the a direction from one end of the running rails 101 and 102 in FIG. 2 to the other end in a state where the hoist 120 is located at the end of the crane girder 110, and secondary scanning, shifting the position of the hoist 120 in the b direction, repeatedly, thereby realizing a zigzag pattern. Conversely, the main scan may be performed in the b direction and the secondary scan may be performed in the direction.

These scans can be used not only for monitoring but also to obtain images of the entire floor of the facility where the crane is installed. That is, in the above-described scanning pattern, the image taken by the camera 124 may be merged. Various well-known techniques can be applied to the method of merging a plurality of images while aligning them with each other. Since there are people and the like other than fixed objects such as equipment and obstacles in the facility, images in which people are not captured preferably are selected and merged. Using the images obtained by scanning at different time zones, even if an image in which a person is shown, an image that can sufficiently represent the floor surface can be obtained.

By the process described above, if an image of the entire floor surface is obtained, it is possible to define the arrangement of equipment and obstacles in the facility. Based on such images, the location coordinates of equipment and obstacles may be specified, and data representing the arrangement of equipment and the like in the facility may be created.

The position detection unit 211 detects the position coordinates of the hoist 120 during the operation of the crane. The detection method is as described in FIG. 1. The position detection unit 211 receives data transmitted from the overhead crane 100 and obtains the position coordinates based on the data. The obtained position coordinates are stored in the operation result database 201.

In the embodiment, the position coordinates are periodically detected with a certain period. On the other hand, since the crane moves relatively linearly in a straight line, for example, while moving at a constant speed, the need to detect position coordinates in detail is not so high. Therefore, the position detection unit 211 temporarily accumulates position coordinates for a certain period and stores the acquired data in the operation result database 201 for the interval judged to be moving linearly at an almost constant speed. By doing this, the amount of data in the position coordinates can be reduced.

The data acquisition unit 212 performs a function of acquiring various data from the overhead crane 100. The acquired data may include image data taken by the camera 124, three-dimensional point cloud data obtained by the laser radar 125, operations on the controller 130, and the like. The acquired data is stored in the operation results database 201.

The maintenance timing judgment unit 220 determines the necessity of crane maintenance and the maintenance period based on the operation result data stored in the operation results database 201. When machine learning is used for these judgments, the maintenance timing judgement unit 220 holds a learning model generated by the learning model generation system 500 and makes a judgment using this. Examples of the maintenance judgment target include a motor for moving the hoist 120, the motor for winding-up/winding-down, the wire 121, the controller 130, and the like.

The basic operation judgment unit 221 determines whether or not the operator performed a predetermined basic operation while the crane is in operation. In the present embodiment, a judgment is made based on comparing the image data taken by the camera 124 to the basic operation database 205. From the three-dimensional point cloud obtained by the laser radar 125, only the point cloud of a person may be extracted, and it may be determined whether or not the basic operation is performed based on this. Comparing image data or three-dimensional point cloud data to the basic operation database 205 can be done by pattern matching, but machine learning is more effective. When machine learning is used, the basic operation judgement unit 221 holds a learning model generated by the learning model generation system 500 and makes a judgment using this.

The statistical processing unit 222 performs various statistical processes related to the operation of the crane. Examples of the statistical processing include the calculation of the operation time of the information processing apparatus, the total transport time of the suspended load, the average transport time, the total moving distance, the average moving distance, the total time or the average value required for lifting and lowering the load, and the aggregation of the number of controller operations. In addition to statistical processing on a daily basis, statistical processing on a weekly or monthly basis may be performed, or processing such as a comparison by day, week, or month may be performed.

The results of statistical processing can be used to determine maintenance timing, operation diagnosis, and the like. The results of statistical processing may also be stored in the operation result database 201.

The hazard assessment unit 223 evaluates the presence or absence of danger and the extent thereof during and after the crane is in operation. In this embodiment, a series of operations for transporting the suspended load are divided into scenes, such as attaching wires to the suspended load, lifting, starting transportation, transporting, unloading, and removing wires, and the danger is evaluated for each scene. The hazard assessment is based on the positional relationship between the suspended load and people, equipment, etc. When machine learning is used for hazard assessment, the hazard assessment unit 223 holds a learning model generated by the learning model generation system 500 and makes a judgment using this.

The accident determination unit 224 determines whether or not an accident has occurred while the crane is in operation. In this embodiment, this judgement is performed based on the positional relationship between the load and people, equipment, the posture of the person, and the like. When machine learning is used to determine the occurrence of an accident, the hazard assessment unit 223 holds a learning model generated by the learning model generation system 500 and makes a judgment using this.

The security operation unit 225 performs unmanned monitoring in the facility by a crane, and when an abnormality is found, it performs a function of dealing with it. Abnormalities include fires and the discovery of suspicious persons. Dealing include changing the crane's scanning pattern and reporting.

The operation diagnosis unit 230 performs a function of diagnosing the operation of the crane after the operation of the crane. Diagnosis contents include the presence and absence of danger and its extent, and operation efficiency.

The transport sequence optimization unit 231 provides a result of optimizing the carrying order of the suspended load by the crane. When transporting multiple suspended loads, depending on the order, the distance that the crane travels with the empty load becomes longer and waste occurs. The transport sequence optimization unit 231 optimizes the carrying order of the suspended load so that the moving distance travel distance in the empty load is shortened.

The optimal route setting unit 233 provides an optimal path that optimizes the transport path of the suspended load by the crane. For example, when transporting a suspended load from point A to point B, a straight line connecting the two points is the shortest travel distance, that is, the optimal path. In this example, the optimal path is obtained in this way based on various constraint conditions.

The layout optimization unit 234 optimizes the layout of equipment and obstacles in the facility where the crane is installed. For example, the shortest carrying path of a suspended load is a linear path connecting the departure and arrival points. The layout optimization unit 234 provides a layout, for example, in which equipment or obstacles on the path are moved to achieve the shortest carrying path. In addition, changes to the origin and arrival of the suspended load itself will be considered.

The display control unit 232 displays the outputs in the various functions described above on the screen of the computer 30 connected to the information processing apparatus 200. It may be displayed on the display 123 attached to the crane. The image may change depending on each function.

When an abnormality such as an accident, fire, or a suspicious person occurs, the image-in-hazard provision unit 235 provides image data and three-dimensional point cloud data between predetermined periods before and after the occurrence of the abnormality. Specifically, the storage location of the image data corresponding to the specified abnormality is specified by referring to the incident database 204, and these are read from the image database 203 or the three-dimensional point cloud database 202. In addition to displaying on the screen of the computer 30, a method of outputting to a recording medium or the like as a series of moving image data can be taken.

The lift-off safety support unit 250 performs a function to support the improvement of safety at the moment when the suspended load leaves the floor surface, that is, at the moment of lift-off. When the crane accurately lifts the center of gravity of the suspended load, the suspended load is lifted off almost without shaking as the crane is hoisted, but if the lifting position is slightly off from the center of gravity, the suspended load may swing forward, backward, left, and right at the moment of the lift-off. As a result, when lifting a heavy object, there is a risk that an accident such as an operator colliding with a suspended load may occur.

In order to suppress such accidents, the lift-off safety support unit 250 records the position of the crane when the suspended load is placed on the floor, and when the suspended load is lifted again, it accurately reproduces the position. By doing this, the crane can accurately lift the center of gravity of the suspended load.

Along with such functions, the lift-off safety support unit 250 also realizes a function of managing a stored position, various functions for accurately reproducing the center of gravity position, and a function for improving convenience for position registration or reproduction. Of course, some of these features can be omitted.

The transmission/reception unit 240 exchanges data with the overhead crane 100, the computer 30, the learning model generation system 500, and the like via the wireless LAN 20 and the Internet. The transmission/reception unit 240 also provides a function as an input unit that accepts commands from the computer 30 to the information processing apparatus 200 in the setting of the optimal path, optimal sequence, optimal layout, and the like.

Next, a functional part of the learning model generation system 500 is described. The learning model generation system 500 generates learning models used in various functions of the information processing apparatus 200 by machine learning and provides them to the information processing apparatus 200. In the present embodiment, it is constructed as a separate system from the information processing apparatus 200, but may be integrated into the information processing apparatus 200.

In the present embodiment, although the information processing apparatus 200 will be described below as providing a learning model unique to the information processing apparatus 200, the learning model generation system 500 can also be a system for generating a general-purpose learning model common to a plurality of cranes.

The operation results database 501, the three-dimensional point cloud database 502, and the image database 503 correspond to the operation results database 201, the three-dimensional point cloud database 202, and the image database 203 in the information processing apparatus 200, respectively. In this embodiment, each database of the information processing apparatus 200 is appropriately copied to the learning model generation system 500 and updated. If machine learning is performed repeatedly using these database, it is possible to perform re-learning reflecting the crane operation results, and to improve the accuracy of the learning model.

The contents of the operation results database 501, the three-dimensional point cloud database 502, and the image database 503 may differ from each database in the information processing apparatus 200 in consideration of the generation of the learning model. For example, data unnecessary for machine learning described below may be omitted. Further, the judgment result made using the learning model in the information processing apparatus 200 may be stored as one of the operation result data.

The transmission/reception unit 540 exchanges data with the information processing apparatus 200 via the Internet. In this embodiment, the data to be exchanged includes operation result data and other data stored in each database, and a learning model.

The learning data generation unit 510 generates data for machine learning based on each data stored in the operation results database 501, the three-dimensional point cloud database 502, and the image database 503. For example, it generates operation results data from the start of the operation until the crane starts moving based on the time at which the controller operation is performed and the position information of the hoist 120. In addition, various data will be generated depending on the way of machine learning.

The maintenance timing judgement model generation unit 521 generates a learning model for determining the maintenance period of the crane. Examples of the maintenance judgment target include a motor for moving the hoist 120, a motor for winding-up/down, a wire 121, a controller 130, and the like. The maintenance timing judgement model generation unit 521 may generate a learning model for each of these subjects.

The hazard assessment model generation unit 522 generates a learning model for evaluating the presence or absence of danger and the degree thereof with respect to the operation status of the crane. In this embodiment, training data indicating the presence or absence of danger and the degree thereof are prepared for various situations, and supervised machine learning based on this data is used. Other methods may be used.

The accident determination model generation unit 523 generates a learning model for determining whether or not an accident has occurred while the crane is operating. In this embodiment, supervised machine learning is used. Other methods may be used.

The basic operation determination learning model generation unit 520 generates a learning model for determining whether or not the operator performed a predetermined basic operation while the crane was in operation. In this embodiment, image data when the original basic operation is performed and image data when these basic operations are not performed are prepared in the basic operation database 505, and machine learning classification is performed using these data as training data. The image of the basic operation database 505 is based on a moving image taken from the top to downward by the camera 124, and is made into a series of still images for each frame, and only the target human part is cut out from each still image data.

The information processing apparatus 200 and the learning model generation system 500 provide various functions described later by the function units described above. The embodiment of the functional unit described in FIG. 4 is only an example, and functional parts other than these may be prepared, or the functional parts shown here may be divided into a plurality of functional parts, or a plurality of functional parts may be integrated.

Figure 5:
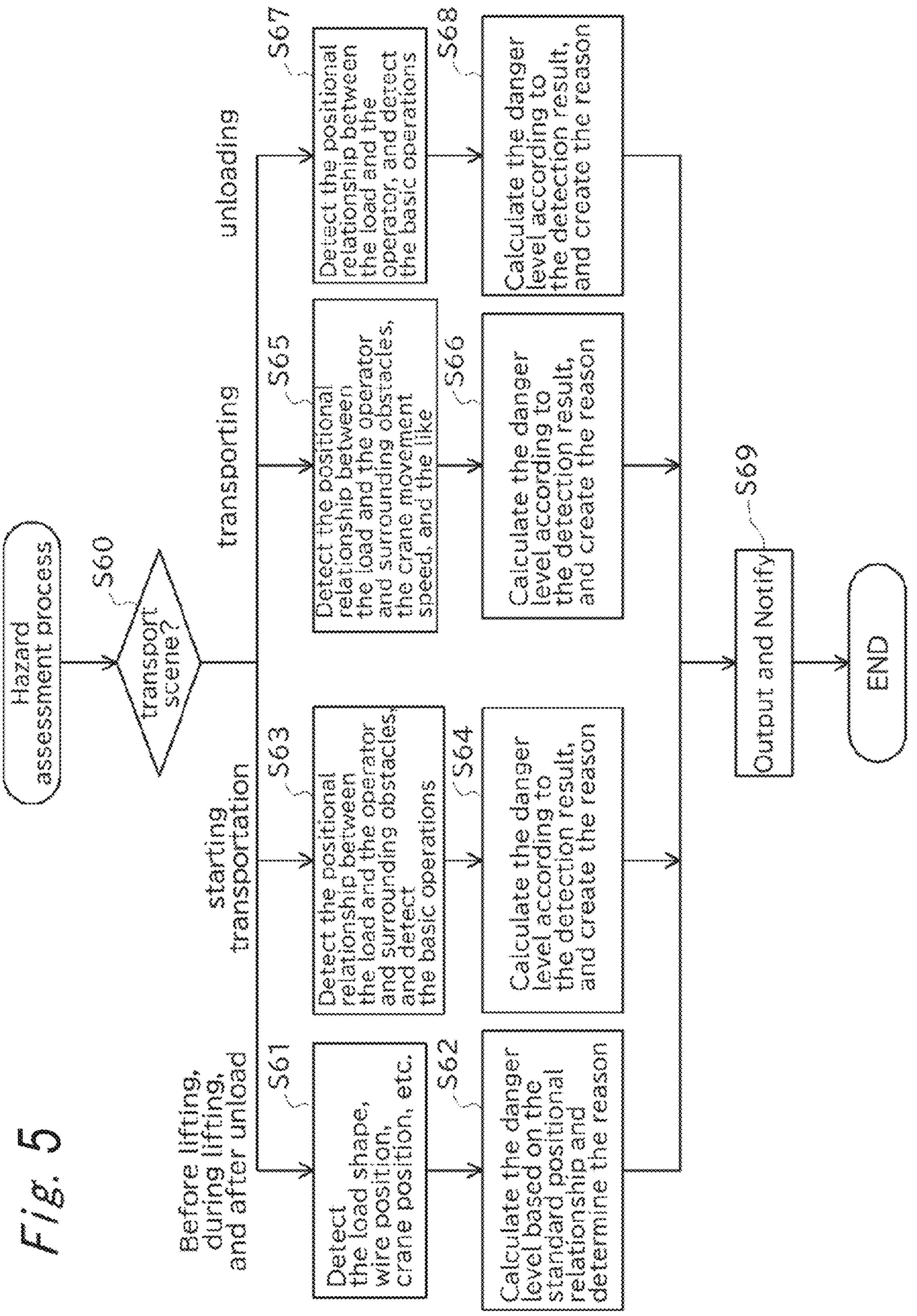
FIG. 5 is a flowchart of hazard assessment process.

B. Hazard Assessment Function (1) Judgment of the Transport Scene:

FIG. 5 is a flowchart of the hazard assessment process. It is a process mainly performed by the hazard assessment unit 223 and the basic operation judgment unit 221 shown in FIG. 4, and in hardware, it is a process executed by the CPU of the information processing apparatus 200. This process is performed after the operation of the crane to determine the presence or absence of danger and the degree thereof based on operation result data, three-dimensional point cloud data, and image data. The posture of the operator may be easily identified by attaching a sensor to the operator's helmet, glove, work clothes, etc., or by affixing a characteristic marker for facilitating recognition by image analysis.

In the following description, "danger level" means an index for representing the presence or absence of danger and the degree thereof.

When processing starts, the information processing apparatus 200 determines which transport scene corresponds to the operation results of evaluating the presence or absence of danger or the like (step S60). In this embodiment, it is divided into six scenes before lifting the suspended load, during lifting, starting transportation, transporting suspended load, unloading, and after unload. During hoisting, it may be subdivided into lift-offing, and after lift-offing. When status data indicating which of these scenes is corresponded to is stored as operation result data, it can be easily determined based on the status data. Even if status data is not used, it is possible to make a judgment based on the position information of the crane, the information of lifting-up/lifting-down, and whether or not the crane is carrying the suspended load. For example, the state after the crane moves with an empty load and stops is judged to be before lifting the suspended load. The state during hoisting is judged to be during lifting of the load. When winding is completed, it is judged that the transportation starts. After the crane starts moving, it is judged to be in transporting. Thereafter, when the crane stops and starts unwinding, it is judged to be unloading. After winding is completed, it is judged that it is after unload. It is possible to judge the scene in various other ways. For example, the presence or absence of a suspended load or the like may be analyzed using image data or three-dimensional point cloud data to determine the transport scene.

When determining the carrying scene of the suspended load, the information processing apparatus 200 evaluates the presence or absence of danger and the degree thereof by the following processing for each scene.

(2) Before and During Lifting of the Suspended Load:

The information processing apparatus 200 detects the suspended load shape, the position of the wire, the position of the crane, and the like (step S61). These detections can be performed by analysis of three-dimensional point cloud data and image data. While the image data is planar and is difficult to specify the distance from the camera 124 to the object, the three-dimensional point cloud data is useful for this analysis because the position can be obtained three-dimensionally. A camera may be attached to the operator's helmet, and the analysis result based on the image data taken by the camera may be used. The camera can capture the angle of the wire, the elongation of the wire, and the rotation and the vibration of the load, etc. when lifting the load.

The information processing apparatus 200 calculates the danger level based on the standard positional relationship and determines the reason (step S62). The standard positional relationship for judging the danger level is set in advance for each transport scene as shown below.

For example, before lifting, the procedure until attaching the wire to the suspended load is targeted. Thus, for example, a positional relationship characteristic of each item can be used as a standard positional relationship based on predetermined items for determining danger such as:

a) whether the operator was in a position where he could check the surrounding conditions of the suspended load before the start of the work;
b) whether the hook is in a safe position relative to the center of gravity inferred from the shape of the suspended load;
c) whether the operator was in a position to inspect the wires;

and the like.

Furthermore, not only the operator but also the position of the assistant assisting the operator around the suspended load may be taken into consideration. In addition, not only the work of attaching wires to the suspended load, but also whether the basic operations, including a safety inspection for the wearing status of the helmet, is conducted before starting the work or not may be considered as a factor for judging the danger level.

Figure 6:
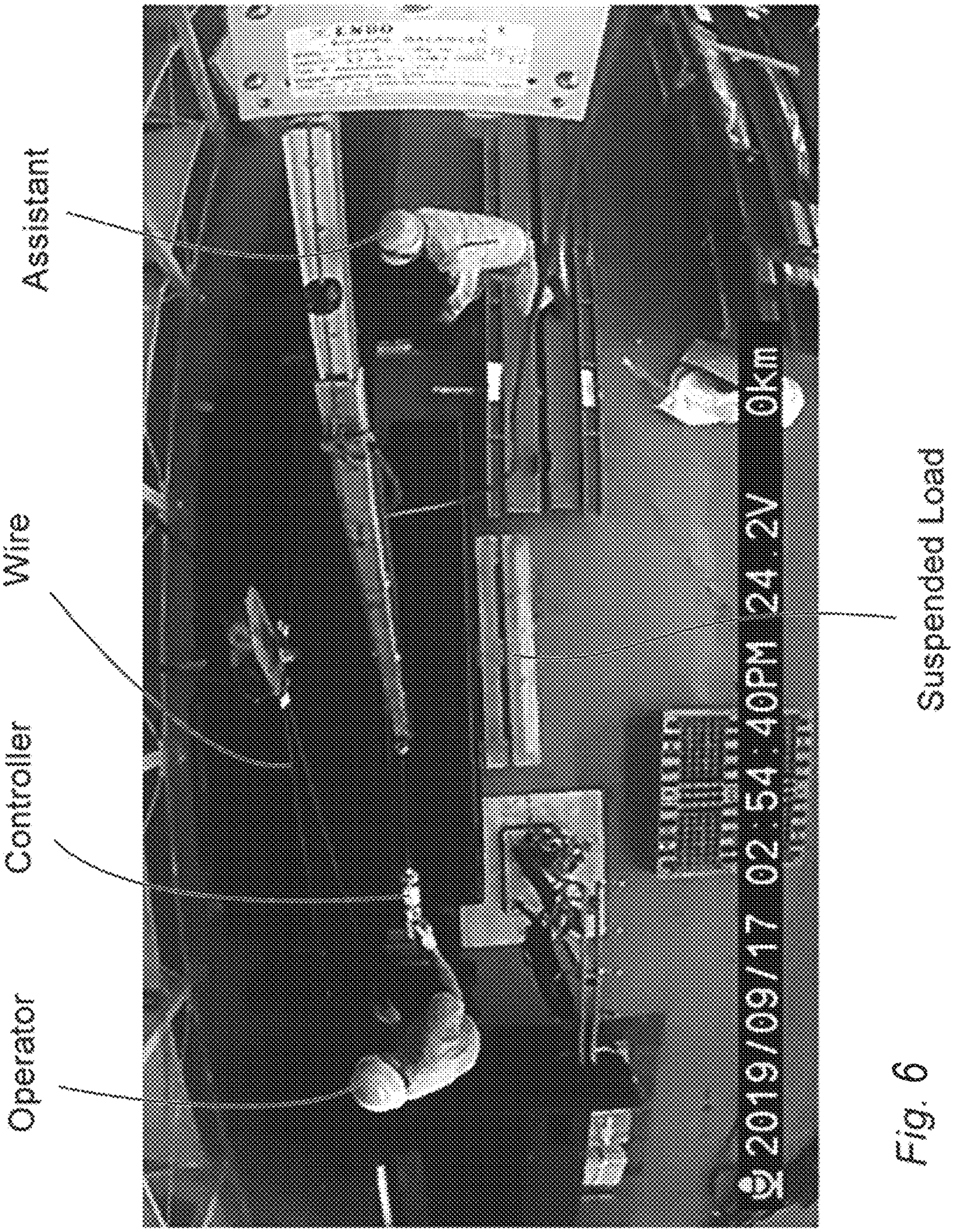
FIG. 6 is an explanatory drawing which shows the scene example before lifting.

FIG. 6 is an explanatory diagram showing a scene example before lifting. It shows that an operator is working with the controller in his hand at one end of the suspended load, and there is another operator at the other end. The suspended load is hung with wires. By analyzing the image data or the three-dimensional point cloud data of this scene, it is possible to obtain the positional relationship of the operator, another operator, the load, the wire, and the like. Then, based on the positional relationship between the suspended load and the wire, it can be determined whether item b) is satisfied or not. In addition, since it can be confirmed that the operator is covering over the suspended load, it is judged that the item c) of wire inspection is conducted.

In this way, by analyzing the image data and the three-dimensional point cloud data, the above-described items can be determined.

In addition, considering the impact of each item on the danger, the risk level for each item is set in advance as an indicator. For items that must be done to avoid danger, the danger level may be set to 100(%), and for items with a low degree of impact, the danger level may be set to 50(%). The danger level can be set arbitrarily, but may be set based on, for example, the probability that an accident occurs when the item is not performed based on the past cases. Further, the danger level does not necessarily need to be expressed in %, and may be expressed by some kind of score or the like.

In step S62, based on the detected positional relationship and the like, the danger level is determined to what extent the positional relationship of the above-described criteria is satisfied. For example, when the danger level of item a) is set to the value A (%), and when the positional relationship corresponding to this item is satisfied, the danger level is 0(%), but when it is not satisfied at all, the danger level is A (%). In the meantime, the danger level is calculated by the A×coefficient according to the degree of satisfaction.

The same calculation is performed for all items. Then, the overall danger level is calculated based on the average value or maximum value of the obtained hazard. In addition, in this calculation process, the item that becomes the maximum danger level has a large influence on the overall danger level. Therefore, the content of the item can be selected as a "reason" for the danger level.

As a factor for determining the danger level, other work environments may be considered. For example, since it is considered that the work of attaching wires to the suspended load is performed in a dark place may cause a mistake, it may be considered whether or not the illuminance of the site being worked on exceeds the standard.

Similarly, for lifting-up, for example, the following items can be considered:

a) Before lifting-up, did the operator who attached the wires to the load gave a signal to the operator of the crane that it was ready?

b) Is there no operator near the wire?

c) Are there no operators around the suspended loads?

and the like.

The danger level can be calculated in the same manner as before lifting and the reason for it also can be selected. Further, in addition to the person operating the crane, the position, operation, and the like of an assistant operator who gives a signal or the like around the suspended load may be considered.

Furthermore, consideration may be given to whether the load is kept level during lifting-up, whether the load has moved horizontally at the time of lift-off, the degree of vibration of the luggage, and the like.

The hoisting speed of the crane during lifting-up the load may be considered. Since there is a predetermined recommended value or an upper limit value for the winding speed, the danger level becomes high when this is exceeded. From this point of view, it may be used to determine the danger level based on the winding speed.

The information processing apparatus 200 outputs the danger level and reason obtained by the above processing as a result (step S69), and ends the hazard assessment process. The result output can take an aspect of displaying the danger level, the reason, and the corresponding image data. This display will be described in detail later. In addition to such a display, the danger level evaluation result may be stored by adding it to the operation result data.

The shape, positional relationship, and the like to be detected in step S61 are for determining the positional relationship of the above-described criteria. Therefore, the content to be detected may be determined based on the positional relationship of the criteria before and during lifting, respectively. The contents to be detected in step S61 may be different in each transport scene before and during lifting.

The hazard assessment process was described as being performed after the operation based on operation result data, but it may be performed in real time as much as possible while the crane is in operation. In this case, when the danger level exceeds the predetermined value, an alarm may be output as a result output (step S69). As alarming, for example, a method of displaying a warning to the crane display 123, a method of sounding an alarm sound at the site during operation, a method of notifying the administrator by e-mail or the like, and the like can be taken.

(3) Start of Transportation:

Next, the process when the transport scene is determined as a transportation start (step S60) is described. The information processing apparatus 200 detects the positional relationship between the suspended load and the operator and surrounding obstacles, and detects whether or not basic operations have been conducted (step S63). Then, according to the detection result, the danger level is calculated, the reason is created (step S64), and the result is output (step S69).

The concept of these process is basically the same as before and during lifting. Before the start of transportation, the following items can be considered as items for setting the positional relationship of the standard:

a) Are there any people and obstacles in the movement path carrying the suspended load?

b) Is there no person near the suspension?

c) Is the suspended load shaking?

and so on. Based on these, the positional relationship and the danger level of the reference can be set, and the danger level for each item can be calculated by the same method as described in step S62.

In addition, at the start of transportation, the basic operation is also detected (step S63). While the standard positional relationship described above means a relatively static positional relationship, the basic operation means the movement of the operator. The basic operation includes, for example, the following;

a) Checking operation of the direction of travel of the suspended load, b) a signal before the start of transportation, and so on.

In this embodiment, a plurality of characteristic postures such as pointing among the basic operations are extracted as a database in advance, and the image data or three-dimensional point cloud data to be determined is analyzed, It was determined whether or not these characteristic postures were detected. The basic operation to operate crane may different company by company. Therefore, a customization function may be provided for the basic operation. That is, each company may be able to sift through the basic operation prepared in advance or add the basic operation prepared independently.

By establishing such a function, it is possible to realize evaluation according to the rules of each company. When a customization function is provided in this way, an auxiliary function for adding its own basic operation may be added. For example, by demonstrating the basic operation while being photographed with a camera, a plurality of postures characteristic of the basic operation is picked up and registered in a database. The idea of basic operation is the same in other situations.

(4) During Transportation:

Next, the process when the scene is determined as the transportation (step S60) is described. The information processing apparatus 200 detects the positional relationship between the suspended load and the operator and surrounding obstacles, the crane movement speed, and the like, and detects whether or not basic operations have been performed (step S65). Then, according to the detection result, the danger level is calculated, the reason is created (step S66), and the result is output (step S69).

The concept of these treatments is basically the same as before and during lifting. During transportation, the following items can be considered as items for setting the standard positional relationship:

a) Are there no people or obstacles near the suspension?

b) Is there any shaking or tilting of the suspended load?

c) Is the travel speed appropriate?

and so on.

Based on these, the positional relationship and the danger level of the reference can be set, and the danger level for each item can be calculated by the same method as described in step S62. Further, during transportation, the situation of the passage and the like may be considered together. For example, in a situation where a foreign object such as oil adheres to the passageway, the operator may fall over, and the crane may become dangerous. Therefore, based on the image taken with the camera, the presence or absence of a foreign body on the passage and the like may be analyzed, and the danger level may be calculated based on this.

Examples of the basic operation during transportation include the following:

a) Checking operation of the direction of travel of the suspended load;

b) Confirmation action when changing direction;

and so on. The detection of the basic operation can be performed in the same manner as described in steps S63 and S64.

(5) During Unloading:

Next, the process when it is determined that the transport scene is in the process of unloading (step S60) will be described. The information processing apparatus 200 detects a positional relationship between the suspended load and the crane operator and surrounding obstacles, whether or not conducting basic operations, and the like (step S67). Then, according to the detection result, the danger level is calculated, the reason is created (step S68), and the result is output (step S69).

The concept of these treatments is basically the same as before and during lifting. During the unloading, the following items are considered as items for setting the positional relationship of the standard:

a) The landing place of the suspended load, whether there are no persons and obstacles under the hanging load?

b) Is the direction of the suspension appropriate?

and so on. Based on these, the standard positional relationship and the danger level is set in advance, and the danger level for each item can be calculated by the same method as described in step S62.

Examples of the basic operation during unloading include the following:

a) Safety checking operation of the landing place of the suspended load;

b) Pre-winding down cue;

and so on. The detection of the basic operation can be performed in the same manner as described in steps S63 and S64.

(6) After Unloading:

Finally, the process when it is determined that the scene is after unloading (step S60) will be described. The processing of the information processing apparatus 200 is the same as before and during lifting (steps S61, S62, S69).

After unloading, the following items can be considered as items for setting the standard positional relationship:

a) Is the hook securely removed from the suspended load?

c) Is the operator not near the wire?

and so on. That is, if hoisting is performed without reliably removing the wire after the unloading, it may cause an unexpected accident, so it is necessary to determine these dangers. Based on these, the standard positional relationship and the danger level is set in advance, and the danger level for each item can be calculated by the same method as described in step S62.

By the above treatment, the danger level and the reason can be determined according to each transport scene. In the above-described embodiment, in the judgment (steps S61 and S62) before, during, and after lifting and unloading, detection of the basic operation was omitted. This is not because there are no basic movements in these scenes, but because in these scenes, it is considered that the standard positional relationship is more important than the basic operations. Therefore, for these transport scenes, basic operation may be detected and judged as in the case of others.

(7) Modification Application of Machine Learning:

It is also useful to apply machine learning to hazard assessment. In the hazard assessment, machine learning can be applied to each of the judgment of whether or not the basic operation described above is performed and the assessment of the danger level. Hereinafter, it will be described in order.

Figure 7:
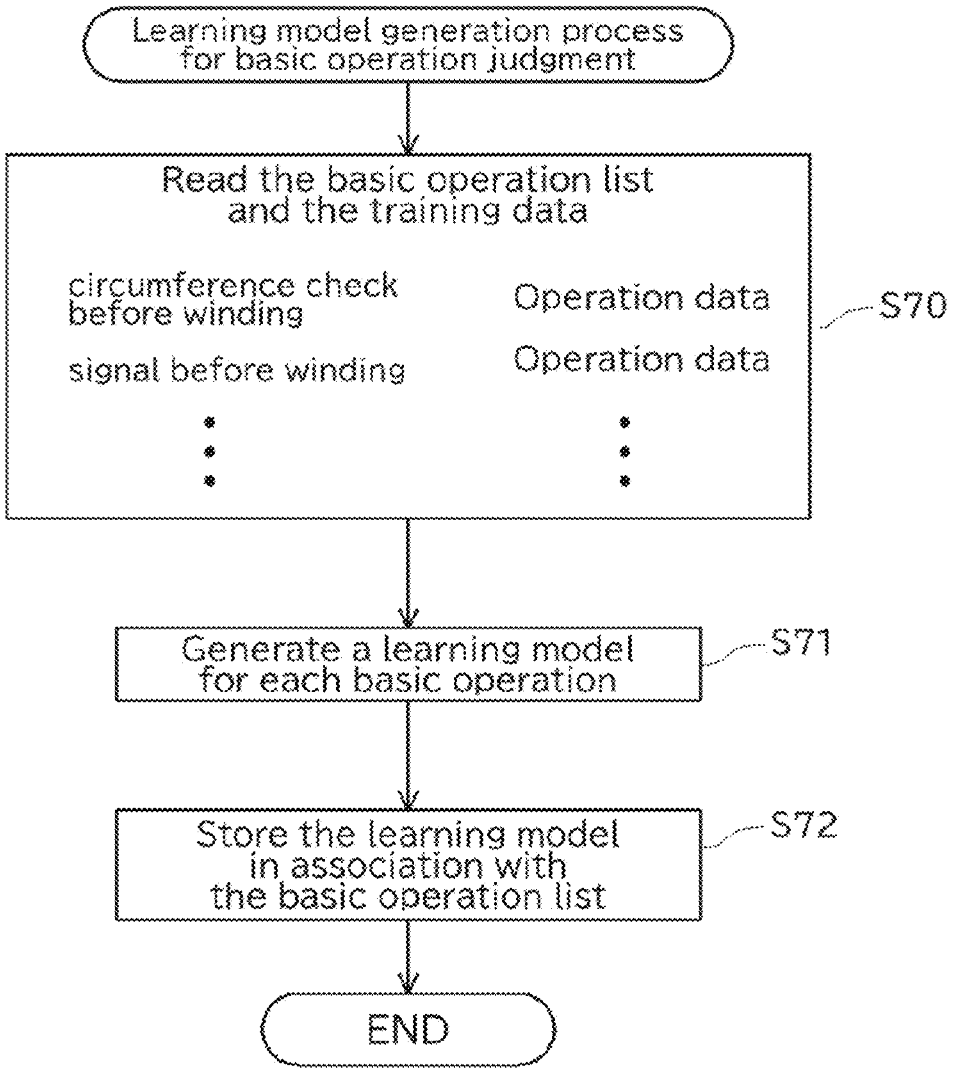
FIG. 7 is a flowchart of the learning model generation process for basic operation judgment.

FIG. 7 is a flowchart of a learning model generation process for basic operation judgment. It is a process mainly performed by the basic operation judgment learning model generation unit 520 shown in FIG. 4, and in hardware, it is a process executed by the CPU of the learning model generation system 500. When the process is started, the learning model generation system 500 reads the basic operation list and the training data (step S70). These are data stored in the basic operation database 505. An image of the data structure is shown in the figure. For example, for the basic operation of “circumference check before winding”, a series of operation data is stored in conjunction with this name. The operation data is a collection of a series of still images representing basic operations. The same applies to “signal before winding” and other basic operations.

Next, the learning model generation system 500 generates a learning model for each basic operation (step S71). Since it is a learning model for determining whether or not the image data to be determined represents this basic operation, machine learning classification as a kind of supervised learning will be performed. The basic operation database 505 may include data on operations different from the basic operation. Further, when generating a learning model for “ambient confirmation before winding”, the operation data for this basic operation may be “correct” training data, and the operation data for other basic operations may be used as “error” training data.

The learning model generation system 500 stores the learning model thus generated in association with the basic operation list (step S72). By storing this learning model in the basic operation judgment unit 221 of the information processing apparatus 200, it is possible to determine whether or not the basic operation has been performed using the learning model.

Figure 8:
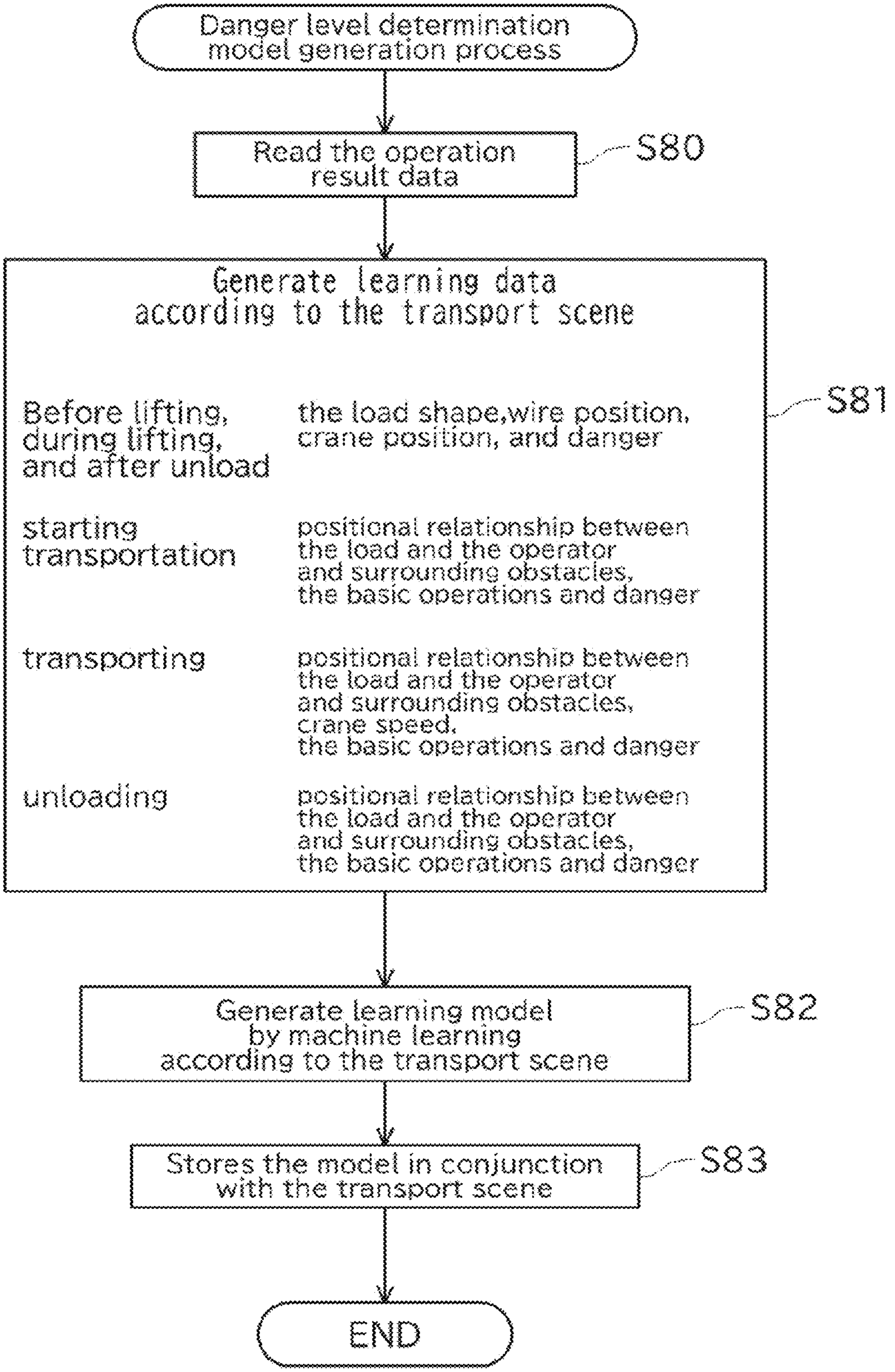
FIG. 8 is a flowchart of the risk judgment model generation process.

FIG. 8 is a flowchart of the danger level determination model generation process. It is a process mainly performed by the hazard assessment model generation unit 522 shown in FIG. 4, and in hardware, it is a process executed by the CPU of the learning model generation system 500. When the process is started, the learning model generation system 500 reads the operation result data (step S80). Then, the learning model generation system 500 generates learning data according to the transport scene (step S81). The contents of the transport scene and the training data are shown in the figure. Each is the same as the contents described in FIG. 12.

The learning model generation system 500 generates a learning model by machine learning according to the transport scene (step S82) and stores it in conjunction with the transport scene (step S83). Various methods can be applied to machine learning, but in this embodiment, supervised learning is performed. In addition, considering the purpose of calculating the danger level, machine learning regression was applied. Specifically, the training data is the one with a risk level attached to the prepared large number of learning data. The danger level should be set at 0~100% for past accident results, etc. However, since it is difficult to set the danger level in this way, each learning data may be evaluated on three stages of the dangerous (100%), slightly dangerous (50%), and not dangerous (0%). Even if individual training data is evaluated in about three stages, since the danger level distribution can be obtained for many learning data, it is also possible to generate a learning model that gives a danger level in the range of 0~100%.

The generated learning model is stored in the hazard assessment unit 223 of the information processing apparatus 200. Even when machine learning is applied, the hazard assessment process is the same as described in FIG. 12. In steps S62, S64, S66, and S68, respectively, a learning model according to the transport scene is used to determine the danger level.

When using a learning model, the logic is often unknown, so it may be difficult to select a reason. If the learning model is generated in a way that is easy for logic to pursue, such as a decision tree, a possible approach is to select the description corresponding to the node that affected the risk outcome as a reason.

(8) Effects:

By the processing described above, the information processing apparatus 200 can determine the danger level and the reason for the operation of the crane. The operation of cranes is divided into various transport scenes, and it is difficult to establish common judgment standards for all of them. In the embodiment, in consideration of such points, in order to evaluate the danger level by dividing it into transport scenes, it is possible to appropriately evaluate the danger level in each transport scene.

In addition, by applying machine learning to the judgment of whether or not the basic operation has been performed, the accuracy can be improved even if machine learning is not applied to the risk determination itself.

Furthermore, since various factors are involved in the assessment of the danger level, it is possible to realize a more appropriate evaluation by applying machine learning.

C. Optimal Routing Function (1) Concept of Optimal Route Setting:

When transporting suspended loads by crane, not much consideration has been given to transport efficiency in the past. However, when moving the suspended load from point A to point B, the path connecting both points in a straight line becomes the shortest distance, and it becomes the most efficient. Therefore, the information processing apparatus 200 provides a function of setting an optimal route so as to increase the transportation efficiency. In practice, it is necessary to avoid facilities and obstacles, so the optimal path is set taking these constraints into account. Hereinafter, the concept of optimal route setting is shown, and the process thereof will be described.

Figure 9:
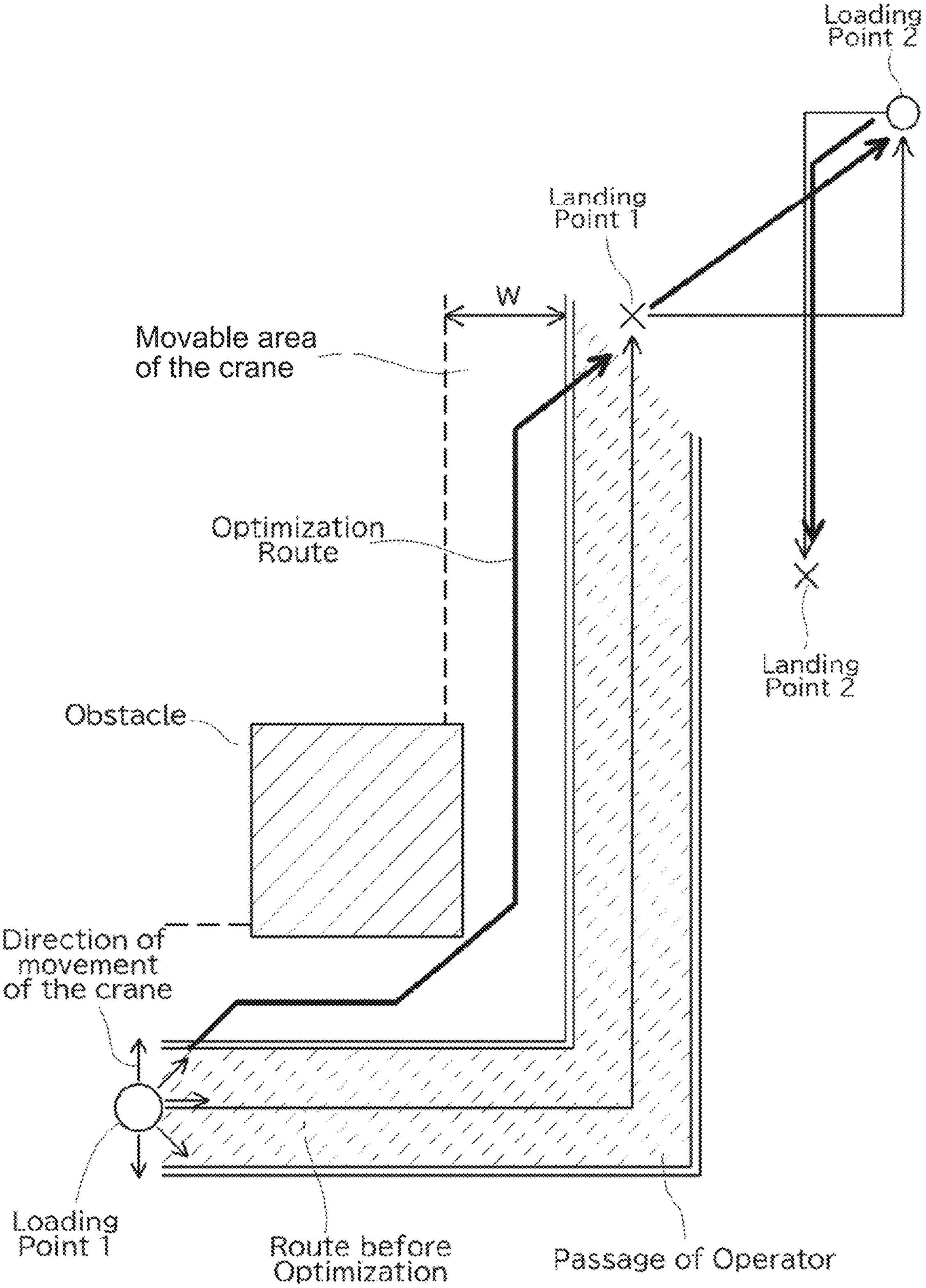
FIG. 9 is an explanatory diagram showing the concept of optimal route setting.

FIG. 9 is an explanatory diagram showing the concept of optimal route setting. The floor plan of the facility is schematically shown. Consider the case where a suspended load is transported from the loading point 1 to the landing point 1. The movement path of the optimization is a path along the passage of the crane operator as shown by the thin solid line. It shows how to set an optimization route for this route. In this embodiment, the following constraints are taken into account.

Constraint 1 is that it does not collide with equipment or obstacles in the facility. In the example in the figure, it is necessary to set a route that can avoid obstacles with hatchings. The constraint conditions may be further tightened and set as a predetermined distance from the equipment and obstacles.

Constraint 2 is to move within a predetermined distance from the passage of the operator. In the figure, the position of the distance W from the boundary of the passage is shown as a dashed line. Within this range is the movable area of the crane.

Constraint 3 is the regulation of the direction of movement of the crane. The moving direction is determined according to the specifications of the crane, and in this embodiment, as shown, the crane can be moved in eight directions. In a crane that can move only in four directions, east, west, north and south, it is four directions. In such a crane, it is technically possible to move the crane in an oblique direction by simultaneously operating buttons in two directions, such as east and north, but since it is a dangerous operation, it is assumed that it is not performed.

Under the above-described constraint conditions, an optimal path having the shortest travel distance from the loading point 1 to the landing point 1 is set. In this example, as shown by a thick line in the figure, the optimal path is a path including movement in an oblique direction close to the landing point 1 direction from the loading point 1. The optimal path illustrated is only an example, and in this example, there are various other travel paths that are the same distance. When a plurality of optimal pathways is obtained, these pathways may be presented to the operator and the operator may select one or the operator may select one in consideration of other evaluation criteria. Examples of the evaluation criteria in such a case include those having a small number of times to change the direction of travel, and those having a large interval from obstacles.

Similarly, an optimal path can be obtained for movement from the landing point 1 to the loading point 2 and from the loading point 2 to the landing point 2. In the figure, the straight line indicated by the thick line is set as the optimal route for the L-shaped movement path indicated by the thin line.

When moving from the landing point 1 to the loading point 2, the crane can move near the ceiling in an empty load. Therefore, in this state, the constraint condition 1 of not colliding with the equipment or obstacles in the facility may be omitted, or only obstacles existing near the ceiling may be considered. Thus, by changing the constraint conditions depending on the presence or absence of a suspended load, it is possible to obtain an even more optimal route.

Figure 10:
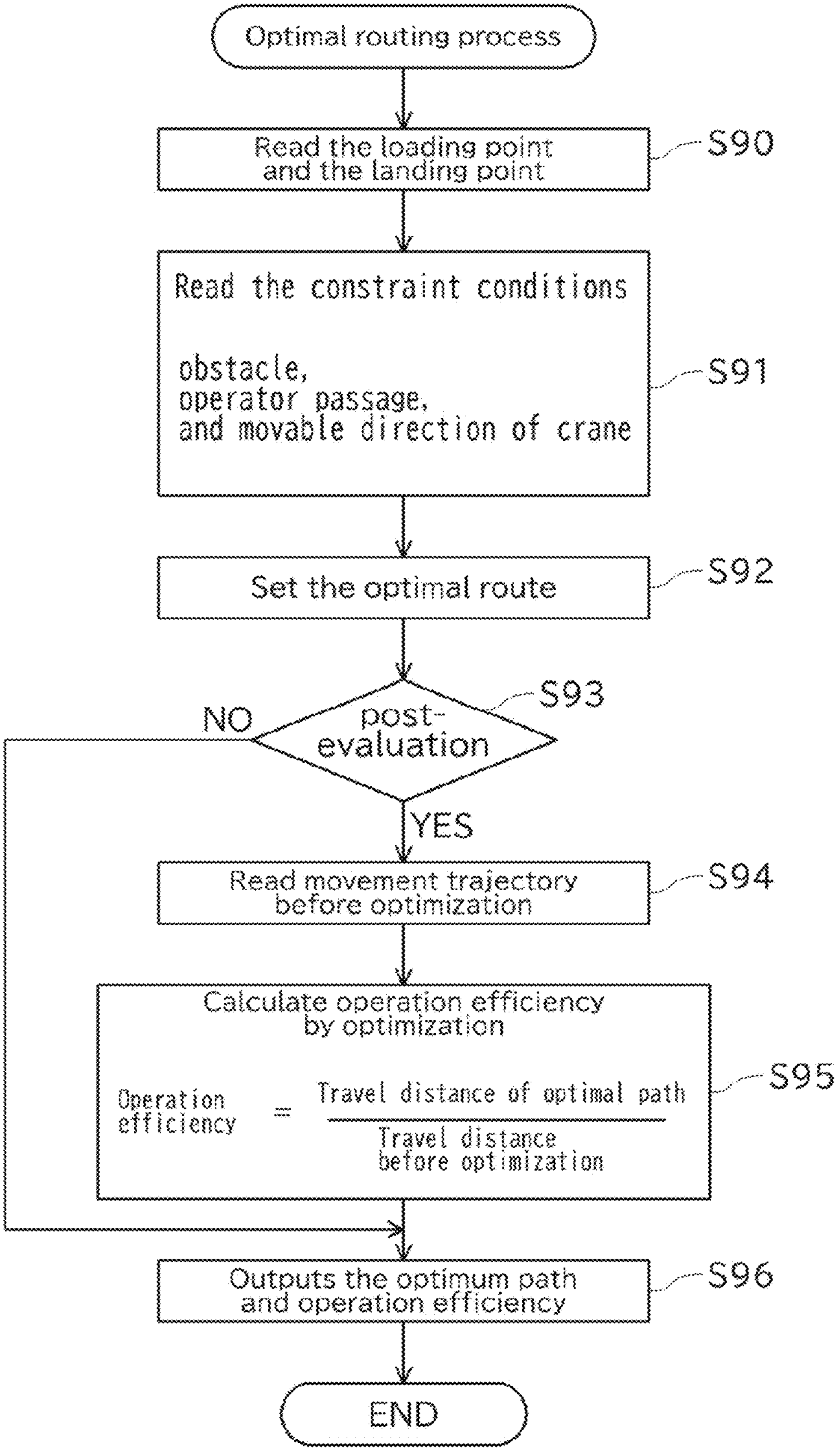
FIG. 10 is a flowchart of the optimal route setting process.

(2) Optimal Route Setting Process:

FIG. 10 is a flowchart of the optimal routing process. It is a process mainly performed by the optimal route setting unit 233 shown in FIG. 4, and in terms of hardware, it is a process executed by the CPU of the information processing unit 200. This processing can be performed, for example, after the operation of the crane, reading operation result data, post-evaluation thereof, and improvement of the route. In addition, before the operation of the crane, the position coordinates of the loading point and the landing point are specified, and as a work for setting a transportation plan, it can be performed as a process to set the optimal route.

When the process is started, the information processing apparatus 200 reads the loading point and the landing point (step S90). When there is a plurality of suspended loads, a plurality of loading points and landing points are read according to the transport order. These may be read from the operation result data or may be read from the operator's instructions via the computer 30.

The information processing apparatus 200 also reads the constraint conditions (step S91). In this embodiment, the position coordinates of the obstacle, the position coordinates of the operator passage, and the movable direction of the crane are read. Since these conditions are generally fixed in the facility, it may be set as a database in advance and read it. The information processing apparatus 200 sets the optimal route according to each of the above-described conditions (step S92). The concept of the optimal path is as described in FIG. 16.

When the optimal route setting process is executed as a post-evaluation (step S93), the information processing apparatus 200 reads the movement trajectory before optimization from the operation result database (step S94). Then, the operation efficiency by optimization is calculated (step S95). In this embodiment, it was evaluated by the "moving distance" of the travel path. Therefore, the ratio between the travel distance before optimization and the travel distance of the optimal path is defined as the driving efficiency. The operating efficiency can be arbitrarily defined.

When the transportation plan is executed (step S93), the processes of steps S94 and S95 are skipped. The information processing apparatus 200 outputs the optimum path and operation efficiency determined above (step S96) and ends the optimal route setting process.

Figure 11:
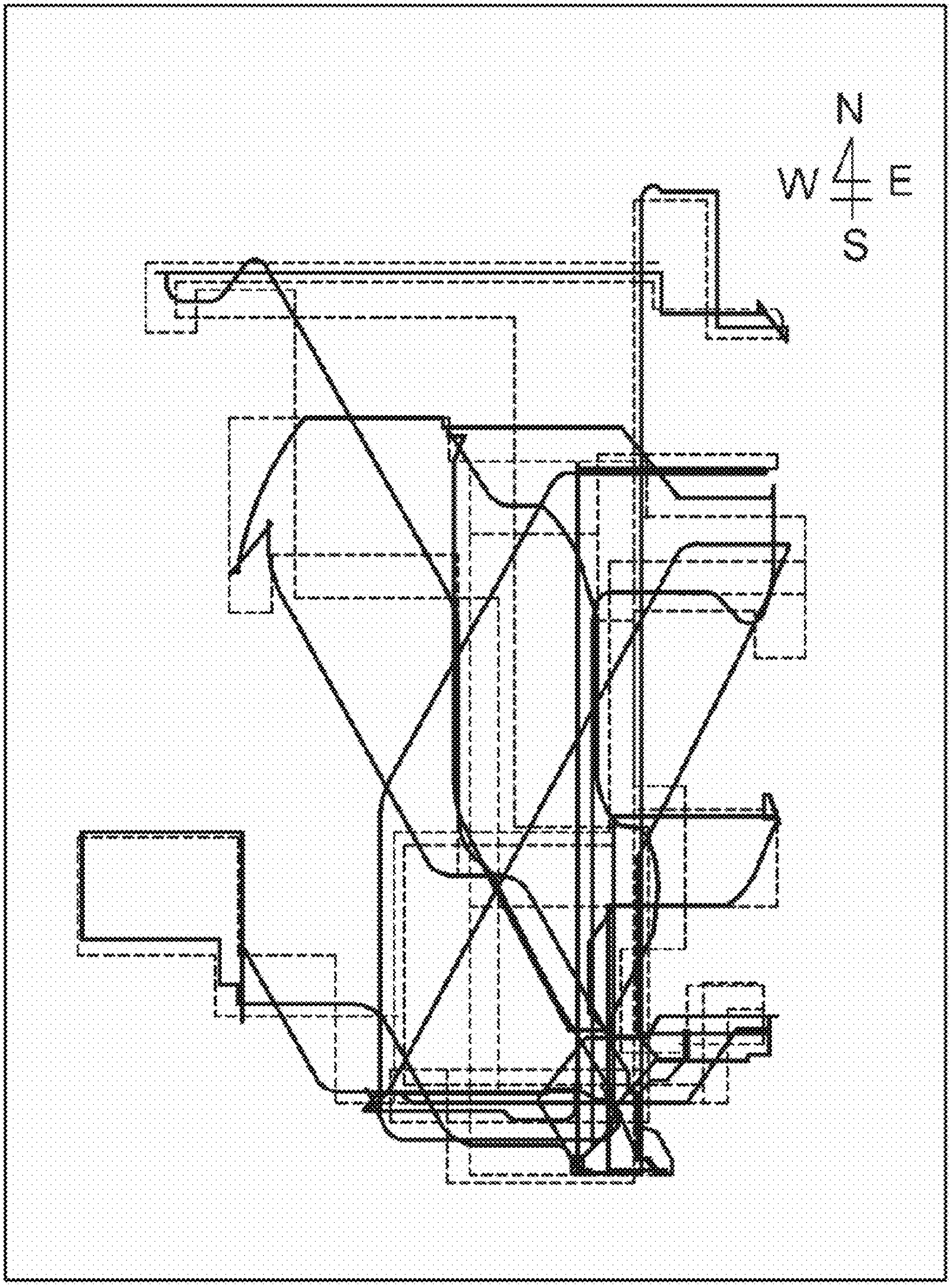
FIG. 11 is an explanatory diagram showing an example of the optimal path.

FIG. 11 is an explanatory diagram illustrating an example of the optimal path. A plan view of the facility is shown. The dashed line indicates the movement trajectory as an operating record, and the solid line indicates the optimal path. According to the example in the figure, it is intuitively understandable that optimization simplifies the movement trajectory and shortens the travel distance. The operating efficiency can be displayed in this surrounding area. By displaying the driving efficiency, it is possible to objectively grasp how short the travel distance is.

In the example of FIG. 11, equipment and obstacles in the facility, passages of operators, and the like may be displayed. By doing this, it is possible to understand why the optimal route has been set.

(3) Effect:

According to the optimal route setting process described above, the crane movement path can be optimized and the operation efficiency can be improved. In the present embodiment, the optimal path is set using the shortest travel distance as an evaluation index, but the optimal path may be set based on other evaluations. For example, a path having a small number of changing direction during traveling may be obtained as the optimal path.

In this embodiment, the optimal path is set analytically, but machine learning may be used. For example, it is conceivable to use reinforcement learning in which the distance traveled is the "reward".

In the above-described embodiment, an example in which the travel distance is the shortest has been studied, but a path having the shortest travel time may be set. When the crane's travel speed is regulated by a certain upper limit regardless of the passage, the path with the shortest travel time coincides with the path with the shortest travel distance. In contrast, if the upper limit of the crane's travel speed varies depending on the passage width, the two paths are not necessary the same. When setting a path having the shortest travel time, in the above-described embodiment, instead of the moving distance, the travel time calculated by the moving distance/travel speed may be used.

D. Operation Diagnosis Function

During the operation of the crane, dangerous situations, not leading to an accident, may occur. In addition, there may be room to improve the operation efficiency. If hazards and operational efficiency can be diagnosed after the crane is operated, these improvements can be made. From this perspective, the information processing apparatus 200 provides an operation diagnosis function for diagnosis of the operation of the crane as described below.

Figure 12:
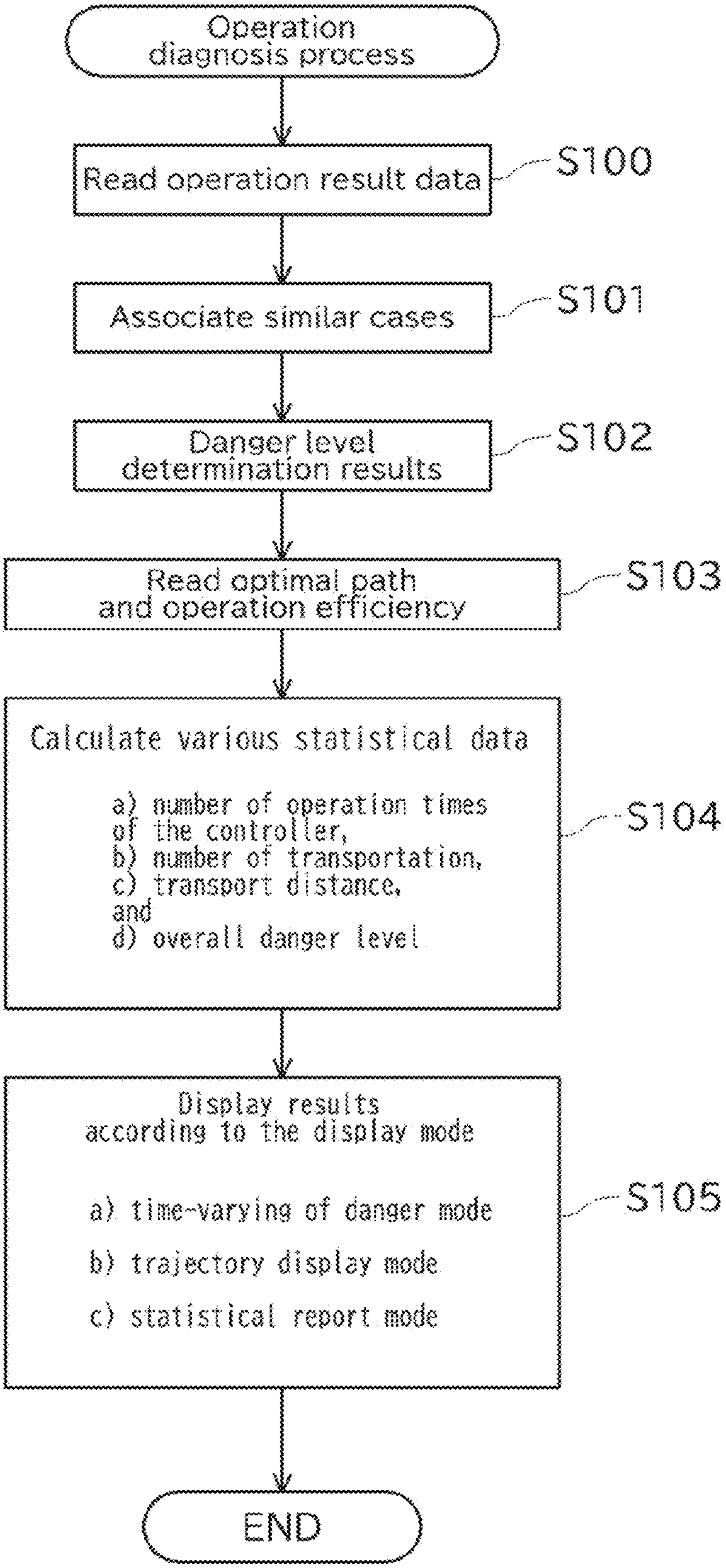
FIG. 12 is a flowchart of the operation diagnosis process.

FIG. 12 is a flowchart of the operation diagnosis process. It is a process mainly performed by the operation diagnosis unit 230 shown in FIG. 4, and in hardware, it is a process executed by the CPU of the information processing apparatus 200. When the process is started, the information processing apparatus 200 reads the operation result data (step S100). The operation result data to be read can be specified by various methods in the same manner as in step S10 of the trajectory display process.

Next, the information processing apparatus 200 performs an association process of similar cases (step S101). For example, when the same transportation work is repeatedly executed every day, it is possible to grasp a situation in which the danger level and operation efficiency are improved by displaying these in contrast. The association of similar cases is to compare multiple operation results in this way.

Judgment of similar cases can be made based on various criteria. In this embodiment, transportation having a common departure and arrival point of the suspended load is related as a similar case. Thus, when the operation results to be read are determined, the information processing apparatus 200 reads the danger level determination results related to these operation results (step S102). The danger level determination result is a result obtained by the danger level evaluation process shown in FIG. 12. The danger level is assumed to be a time series of memory of the judgment results during the operation of the crane.

Then, the information processing apparatus 200 reads the optimal path and operation efficiency (step S103). The optimal path and the like are results obtained by the optimal route setting process described in FIG. 17. The operation efficiency may be calculated by dividing it into the transportation efficiency between departure and arrival points for each suspended load, the transportation efficiency with empty loads, and the like, and the overall operation efficiency for the entire travel route is calculated.

The information processing apparatus 200 calculates various statistical data (step S104). Statistical data includes the number of operation times of the controller pushbutton, the number of times the suspended load is transported, the transport distance, the overall danger level, and the like. Other statistical data may be obtained.

The information processing apparatus 200 displays the results obtained by the above process according to the display mode (step S105). In this embodiment, three display modes were prepared. In the time-varying of danger mode, a graph of the time-varying of the danger level during operation is displayed. In the trajectory display mode, the movement trajectory based on the operation results and the optimal route are displayed in contrast. In the statistical report mode, various statistical results obtained in step S104 are displayed. These display modes may be used in combination. Further, display modes other than these may be provided.

Figure 13:
FIG. 13 is an explanatory diagram showing an example of display of driving diagnosis.

FIG. 13 is an explanatory diagram showing a display example of driving diagnosis. An example of a time-varying of danger mode is shown. On the right side of the figure, the transport image during transportation by crane is displayed. The image data stored in the image database 203 is displayed in the form of a moving image. Below that, a hazard graph is displayed that represents the time-varying danger level. The correspondence between the image data and the danger level can be understood by the position of the slide bar. In the example of the figure, the image at the time when the danger level becomes the highest is represented. By moving the slide bar using a mouse or the like, image data at a specific point in time can also be displayed.

On the left side of the image data, the overall risk level is displayed. This is a common part with the display as a statistical report mode. Underneath, buttons for past case 1 and past case 2 are displayed. Click on them to view the past cases associated with each. In this embodiment, the display is switched to past cases, but for the danger level graph, past cases may be superimposed and displayed. By doing this, it is possible to objectively grasp the situation where the danger level has been improved.

In the example of FIG. 13, only a graph of the danger level is shown, but the operation efficiency may be displayed together. At the bottom, the reason is displayed corresponding to the overall danger level. As explained earlier in the hazard assessment process (FIG. 5), since the reason is judged together with the danger level, it is possible to create a reason for the overall danger level by collecting these together and sorting them in order of high danger level.

In addition, when you click "normal operation", the basic operation that should be performed is displayed. It is not necessary to prepare normal operation corresponding to all scenes of operation results. For example, if an item that the basic operation is not performed is included as a reason for the overall danger level, a method of displaying the corresponding basic operation can be taken. Further, after clicking the normal operation, a pull-down menu of the basic operation is displayed, and the operator may select from these.

According to the operation diagnosis process described above, after the operation of the crane, the danger and operation efficiency can be objectively diagnosed. It is also possible to compare with past cases. These diagnoses and contrasts can help improve the operation of the crane.

According to the statistics of accident examples, there are many accidents caused by a mistake in pressing a button on the controller or a mistake that the operator misunderstands the direction to move. In addition, it is said that there are many accidents related to suspended loads, such as operators being caught in the suspended load or laying under the suspended load. Therefore, in the operation diagnosis process, when these mistakes are found, a function to call attention may be provided with particular emphasis. For example, for these mistakes, a high value may be set as an evaluation value when determining the danger level. Further, regardless of the hazard assessment, the time when these mistakes occur may be emphasized and displayed.

In addition, various methods for detecting a mistake in pressing a button can be considered. For example, in a case pressing the push button in a certain direction, stopping the operation within a very short time, and pressing the button in the reverse direction, it may be determined that a pressing error has occurred. Further, when moving in the direction of contacting a wall, a person, or the like around the suspended load, it may be determined that a pressing error has occurred even if it is a short time.

E. Layout Optimization Function

Figure 16:
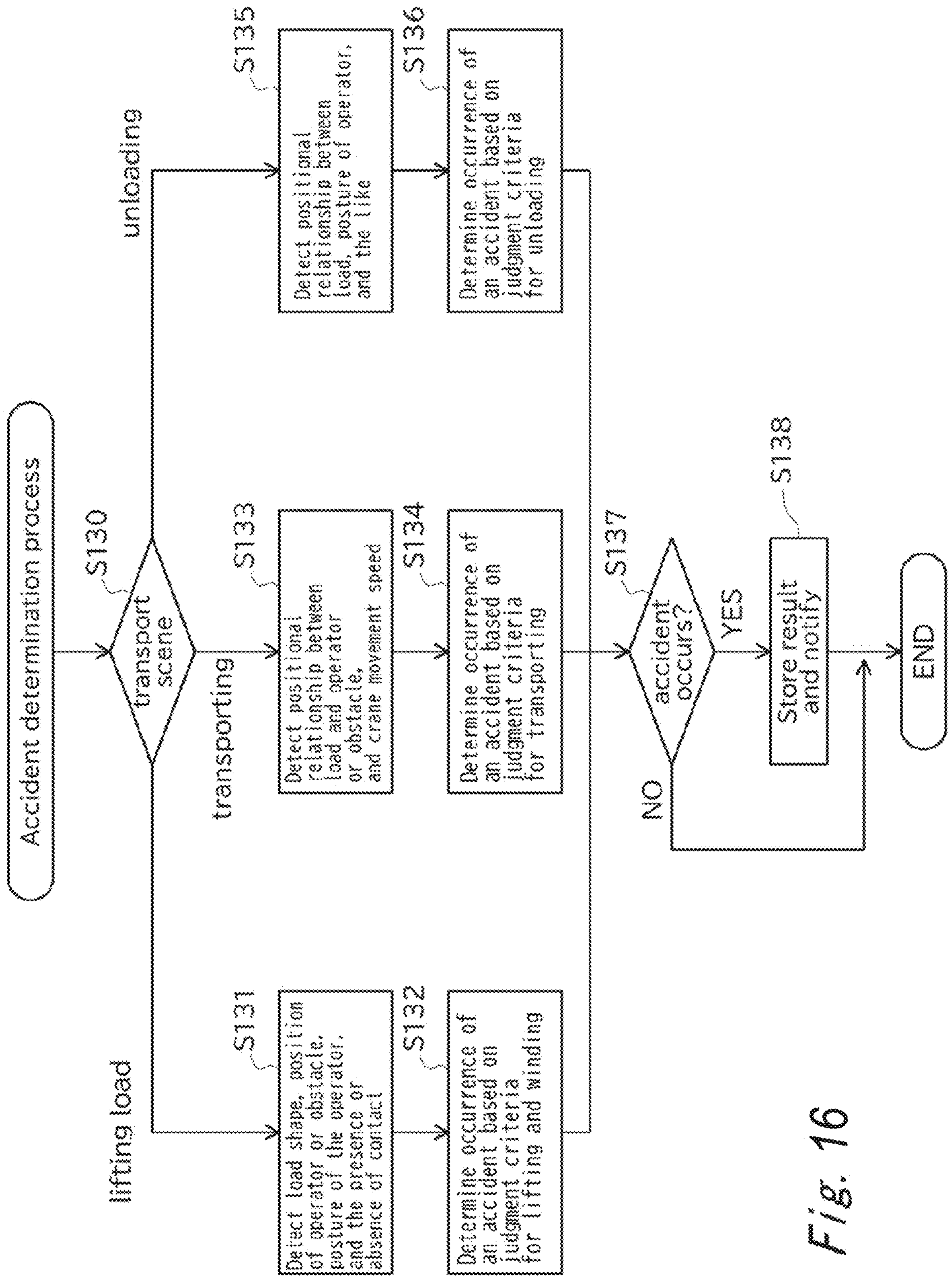
FIG. 16 is a flowchart of accident determination processing.
Figure 17:
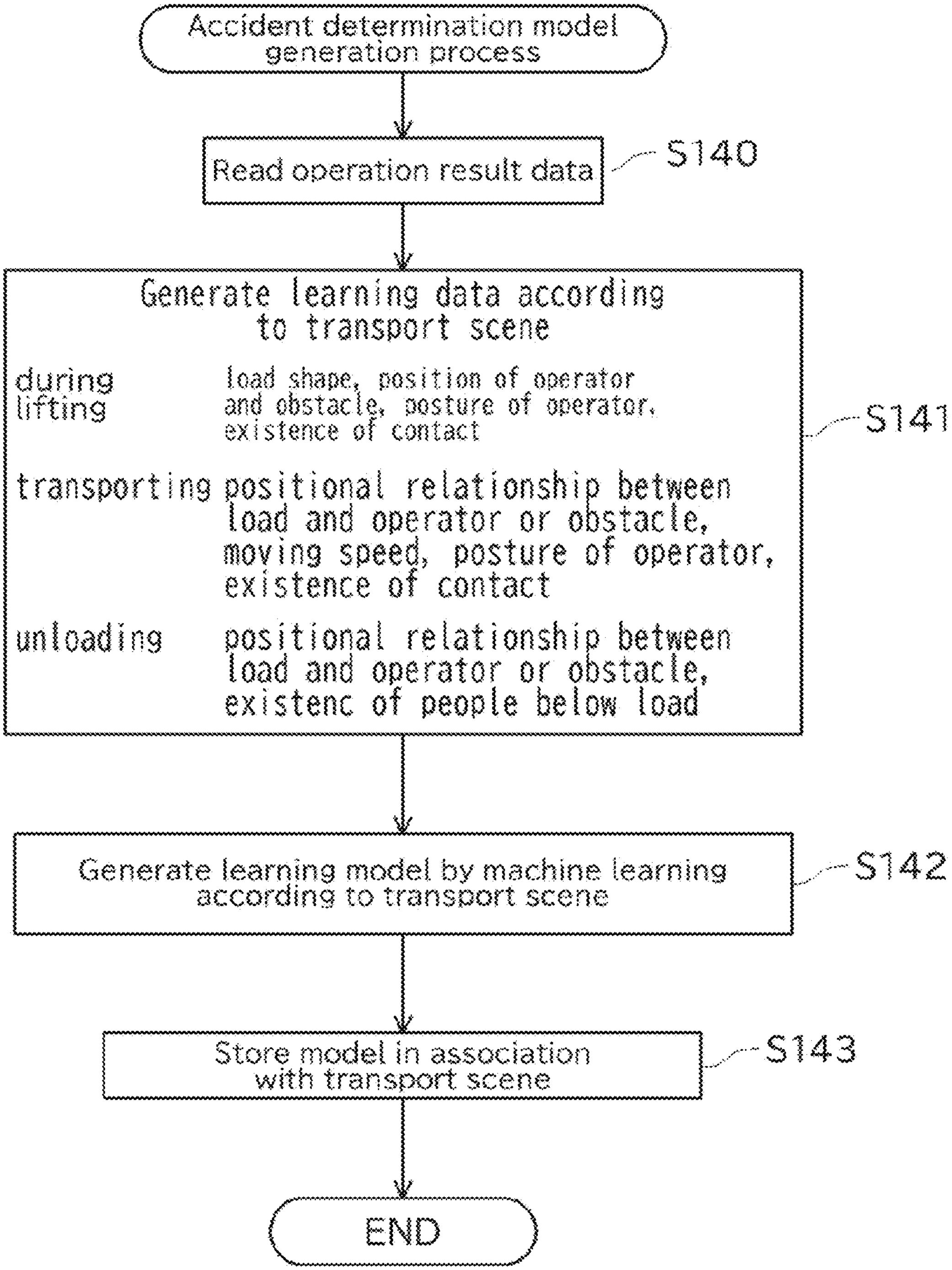
FIG. 17 is a flowchart of the accident determination model generation process.

In FIGS. 16 and 17, optimization of the route when a suspended load is transported by a crane is explained. However, this optimal route is one in which equipment and obstacles in the facility are fixed. To achieve further optimization, it is preferable to move the equipment or the like or change the departure and arrival point of the suspended load. From this perspective, the information processing apparatus 200 provides a function of optimizing the layout. This function will be described below.

Figure 14:
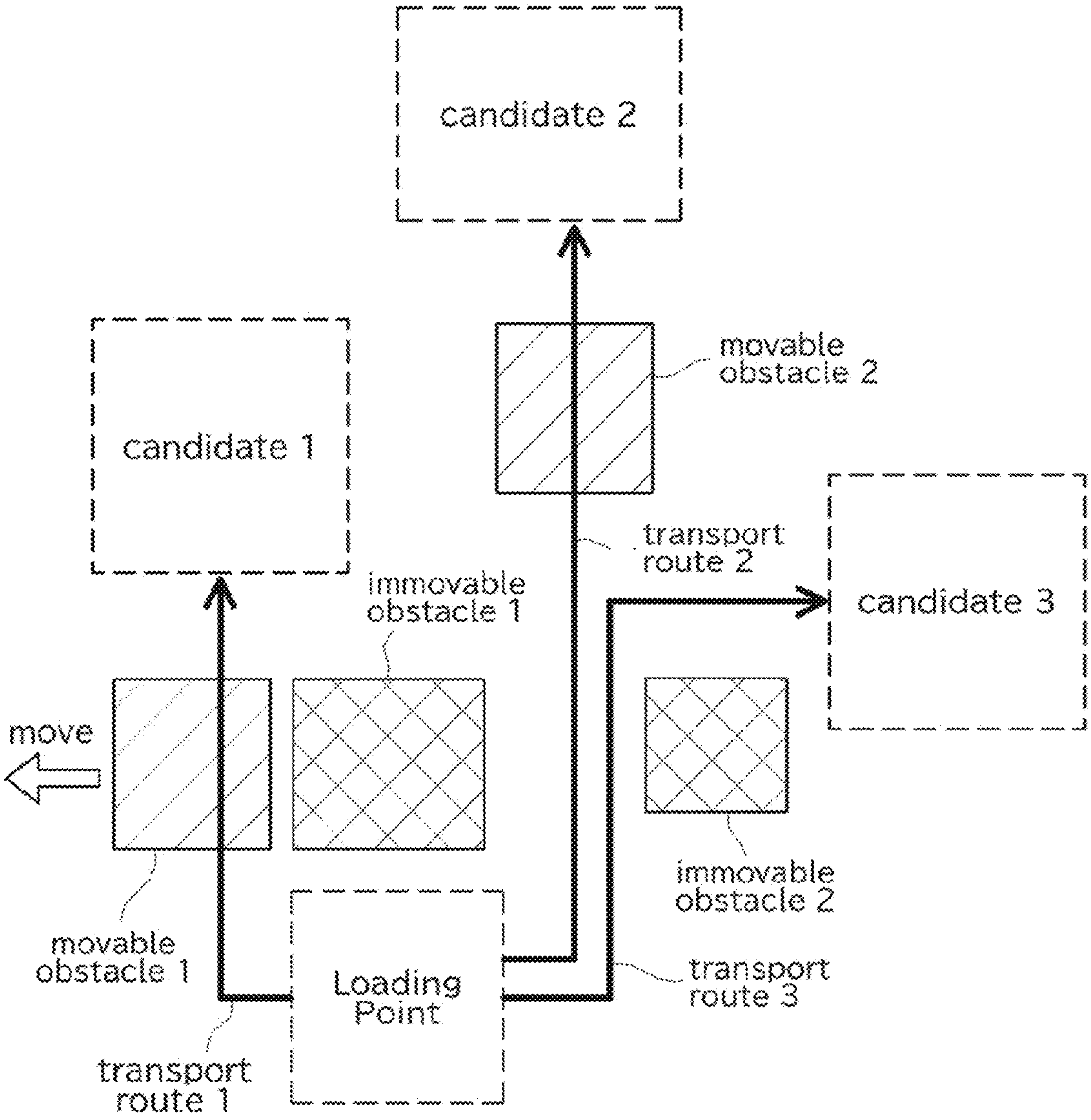
FIG. 14 is an explanatory diagram showing the concept of layout optimization.

FIG. 14 is an explanatory diagram showing the concept of layout optimization. Consider the case where a suspended load is transported from the loading point. Candidate 1 to candidate 3 can be considered as the landing point of the suspended load.

First, each optimal path for transporting to candidate 1 to 3 is obtained by the optimal route setting process (FIGS. 16 and 17). At this time, among the equipment and obstacles in the facility, those that can be moved are omitted to obtain the path. In the example of the figure, the path to the candidate 1 is considered in a state of non-existing the movable obstacle 1, and the path is obtained by considering the immovable obstacle 1. Thus, transport route 1 is obtained. Similarly, transport path 2 was obtained as the transport path to the candidate 2 by treating the movable obstacle 2 not existing. The transportation path 3 is obtained as the transportation path to the candidate 3 by taking into account the immovable obstacle 2.

Then, among these transportation routes 1 to 3, the one with the shortest travel distance is selected. In the example of the figure, if the transport path 1 is selected, the candidate 1 is selected as the landing point of the suspended load, and the movable obstacle 1 is moved so as to realize the transport path 1. Thus, the landing point of the suspended load and the layout of movable obstacles can be optimized.

FIG. 14 illustrates one suspended load, but by repeating this process, the optimal layout for a plurality of suspended loads can be set. In the example of FIG. 14, the loading point is fixed, but a plurality of candidates may be provided as the loading point. In this case, the process described in FIG. 14 may be performed for each loading point candidate, and the one having the shortest travel distance may be selected.

Figure 15:
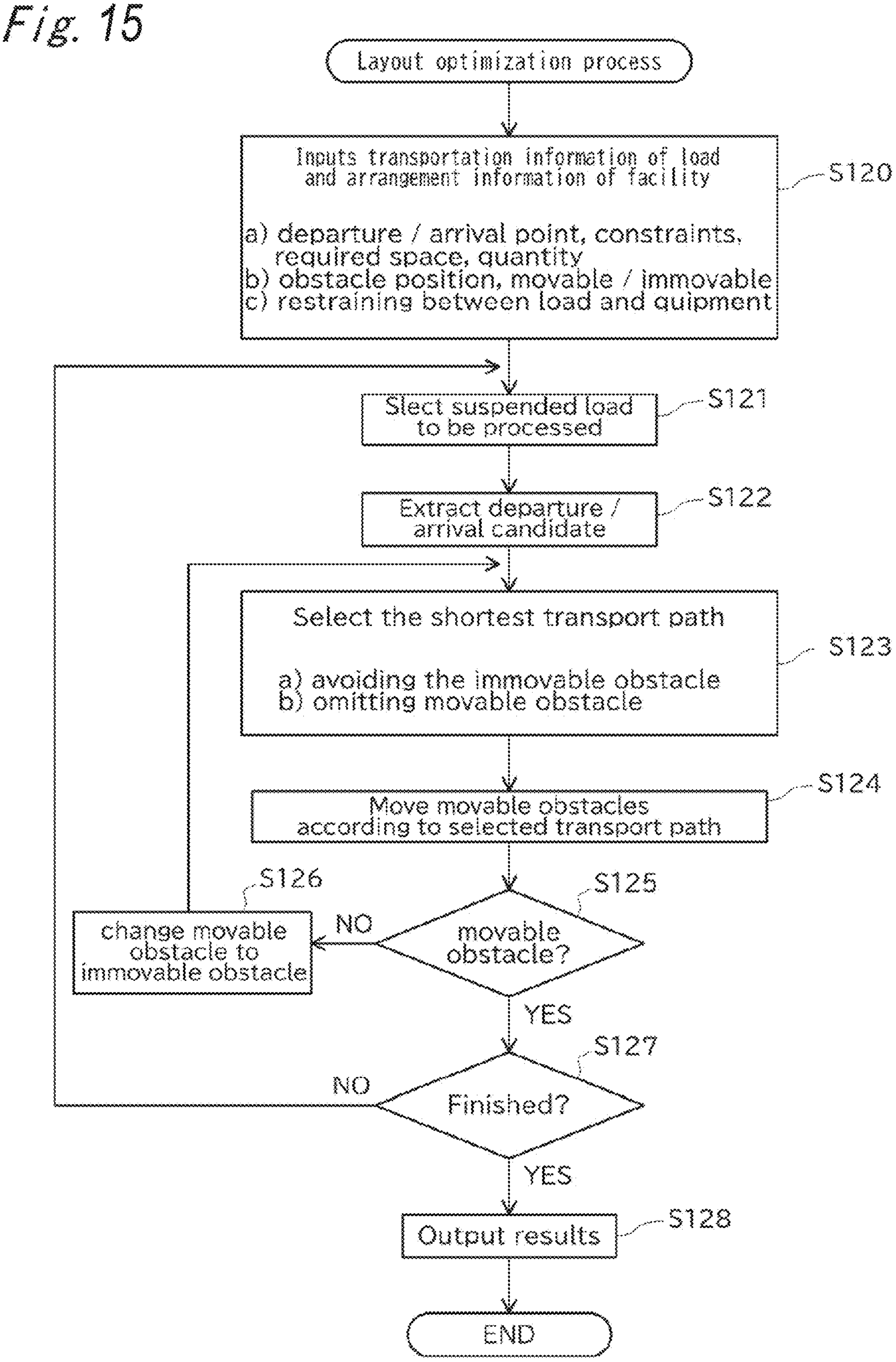
FIG. 15 is a flowchart of layout optimization process.

FIG. 15 is a flowchart of the layout optimization process. It is a process mainly performed by the layout optimization unit 234 shown in FIG. 4, and in hardware, it is a process executed by the CPU of the information processing apparatus 200. This process can be performed at the planning stage, or it can be performed as an improvement of the layout based on the operation results.

When processing is started, the information processing apparatus 200 inputs the transportation information of the suspended load and the arrangement information of the facility (step S120). Examples of this information include the departure and arrival point of the suspended load, the constraint, the required space, the quantity, and the like. The constraint conditions are as described in the path optimization process and the transportation sequence optimization process. The required space means the space required for the landing point.

Other information to be input includes the position of the obstacle and the type of movable/immovable, and the restraining between the load and the equipment. For example, if a part is to be transported near a particular machine for processing, the landing point of the part will be constrained to the position of the machine. As another example, if the finished product is shipped outside the facility by truck, the destination of the finished product within the facility will be bound to the loading yard on the truck. Binding means a restraining relationship when the loading position or landing point of the suspended load is thus constrained by the facility.

When the information is entered, the information processing apparatus 200 selects a suspended load to be processed from among a plurality of suspended loads (step S121). The selection method is arbitrary, but for example, a large size may be preferentially selected.

Then, the information processing apparatus 200 extracts the departure/arrival candidate point (step S122). The candidate departure and arrival points will be extracted in consideration of the required space and the binding to the equipment for the target load.

Next, among these departure and arrival candidate points, a point having the shortest transport path is selected (step S123). At this time, as described with reference to FIG. 14, the transport route is determined by avoiding the immovable obstacle and omitting the movable obstacle. This process determines the candidate departure and arrival locations of the target suspended load.

Next, the information processing apparatus 200 changes the position of movable obstacles according to the selected candidate point and the transport path (step S124). It corresponds to a process in which the movable obstacle 1 is moved In FIG. 14.

However, in some cases, such as when there is no space to move movable obstacles, movable obstacles cannot be moved. Therefore, the information processing apparatus 200 determines whether or not the movable obstacle can be moved (step S125), and if it cannot be moved, it changes the type of movable obstacle to an immovable obstacle (step S126), and executes the processes of steps S123 and S124 again. By doing this, feasible candidate departure, arrival locations and layout are determined.

The information processing apparatus 200 repeatedly executes the above process until the process is completed for the entire suspended load (step S127), outputs the result (step S128), and ends the layout optimization process.

According to the layout optimization process described above, since the departure/arrival point and layout of the suspended load can be optimized, the transportation efficiency can be further improved.

In the embodiment, a method for obtaining the optimal layout by analysis has been shown, but it may be used as a method for obtaining the optimal layout using machine learning. For example, reinforcement learning can be used in which the distance traveled by the suspended load is the "reward". By doing this, it is possible to obtain the departure and arrival points and layouts where the travel distance is shortened by machine learning. In the embodiment, "travel distance" is used as an evaluation for optimization, but optimization may be performed based on other evaluations.

F. Accident Detection Function

During crane operation, various accidents may occur. If an accident can be detected during operation, it is possible to promptly take measures such as reporting. In addition, since the system of the present embodiment is equipped with a camera 124, an image of an accident can be recorded, so if the image at the time of the accident can be quickly identified, it can be used for analysis of the cause of the accident or the like. From this point of view, the information processing apparatus 200 provides a function for determining the occurrence of an accident. This function is described below.

(1) Judgment of the Transport Scene:

FIG. 16 is a flowchart of the accident determination process. It is a process mainly performed by the accident determination unit 224 shown in FIG. 4, and in hardware, it is a process executed by the CPU of the information processing unit 200. This process is executed to determine the occurrence of an accident based on operation result data, three-dimensional point cloud data, and image data during the operation of the crane. In addition to image data and the like, sensors or characteristic markers which makes it easier to identify by image analysis may be attached to the operator's helmet, gloves, work clothes, etc., to easily identify the posture of the operator. Further, this treatment may be performed to identify the scene where the accident occurs after the operation of the crane.

When processing is started, the information processing apparatus 200 determines which transport scene corresponds to the operation status of the crane (step S130). In this embodiment, it is divided into four scenes: lifting the suspended load, transporting, unloading, and winding up after unloading. It may be subdivided in the same manner as the hazard assessment (FIG. 5).

The judgment of the transport screen can be determined, for example, based on the operation of the pushbutton of the controller. For example, if a hoisting is performed after the crane is stopped at a certain place for a predetermined period of time, it can be judged as "lifting". In addition, when the movement operation is performed, it can be judged that it is "transportation". If the rewinding operation is performed after moving, it can be judged as "unloading". Thereafter, if the hoisting operation is performed again, it can be judged as "hoisting" after unloading the load.

When determining the carrying scene of the suspended load, the information processing apparatus 200 evaluates the presence or absence of danger and the degree thereof by the following processing for each scene. It may be determined by the same method as the hazard assessment (FIG. 5).

(2) During Lifting and Winding of Suspended Loads:

The information processing apparatus 200 detects the shape of the suspended load, the position of the operator or obstacle, the posture of the operator, and the presence or absence of contact (step S131). These detections can be performed by analysis of three-dimensional point cloud data and image data. While the image data is planar and difficult to specify the distance from the camera 124 to the object, the three-dimensional point cloud data is useful for this analysis because the position can be grasped three-dimensionally. Then, the information processing apparatus 200 determines the occurrence of an accident based on the judgment criteria for lifting and winding (step S132).

For example, before lifting, the procedure until attaching the wire to the suspended load is targeted. Thus, for example, the following can be used as judgement criteria:

a) whether the suspended load is tilted to the extreme;

b) whether a person is lying down near the suspension; and the like.

When an accident has determined to be occurred according to these standards (step S137), the information processing apparatus 200 stores the judgment result in the incident database 204 along with the time and reports (step S138). For example, a method of notifying the facility by an alarm sound, a method of displaying an accident occurrence on the crane display 123, a method of sending an email to a pre-specified address, a method of calling a telephone and broadcasting a voice message, and the like can be performed.

(3) During Transportation:

Next, process when it is determined that the transport scene is transportation (step S130) is described. The information processing apparatus 200 detects the positional relationship between the suspended load and the crane operator and surrounding obstacles, the crane movement speed, and the like (step S133). Then, based on this detection result, the occurrence of an accident is determined based on the judgment criteria during transportation (step S134), and the result is stored and reported according to the result (steps S137 and S138).

The criteria for judging during transportation include the following:

a) Is there a person lying near the suspended load?

b) Is there any extreme shaking or tilting of the suspended load?

c) Is the movement speed not overspeed?

and so on.

(4) During Suspended Unloading:

Next, process when it is determined unloading (step S130) is described. The information processing apparatus 200 detects the positional relationship between the suspended load and the crane operator and surrounding obstacles, the posture of the person, and the like (step S135). Then, based on this detection result, the occurrence of an accident is determined based on the judgment criteria for loading and unloading (step S13 6), and the result is stored and reported according to the result (steps S137 and S138).

The criteria for judging during the suspension and unloading include the following:

a) Are there no persons and obstacles under the load?

b) Is there an extreme tilt in the suspended load?

and so on. In addition, although it is difficult to determine the existence of the person under the suspended load only by the image data during the unloading, it can be determined based on a series of images before unloading. That is, in the case that a person is determined to be exists close to the suspended load in the image data before the unloading, moving out of the range of the image is not confirmed subsequently, and the person cannot be confirmed at the time of unloading, the person is likely to exist under the suspended load.

(5) Modification Application of Machine Learning:

It is also useful to apply machine learning to determine the occurrence of an accident. FIG. 17 is a flowchart of the accident determination model generation process. It is a process mainly performed by the accident determination model generation unit 523 shown in FIG. 4, and in hardware, it is a process executed by the CPU of the learning model generation system 500.

When the process is started, the learning model generation system 500 reads the operation result data (step S140). Then, the learning model generation system 500 generates learning data according to the transport scene (step S141). The contents of the transport scene and the training data are shown in the figure. Each is the same as the contents described in FIG. 25.

Then, the learning model generation system 500 generates a learning model by machine learning according to the transport scene (step S142) and stores it in association with the transport scene (step S143). Various methods can be applied to machine learning, but in this embodiment, supervised learning is performed. Specifically, the training data is prepared by setting information that no accidents have occurred to a large volume of learning data.

Considering that many of the transport scenes are in a state where accidents have not occurred, it may be possible to conduct unsupervised learning. In this method, based on the operation result data, learning for generating a cluster is performed. When the crane is operating, it is considered that most of them are in a normal state, so the area where the training data is concentrated is considered to represent the normal state. On the other hand, data that deviates from this concentrated area can be said to be in a state where abnormalities are occurring. Therefore, if a learning model is generated to recognize a region considered normal as a cluster based on the training data, it can be used for the judgement of accidents.

Actually, the cluster referring normal states is represented by, for example, its central CG and the distance R. When the data to be determined exceeds the distance R from the central CG, it is judged to be outside the cluster and a state with a certain possibility of accidents. By doing this, if it is determined whether or not the data at the time of operation belongs to the cluster, it is possible to determine the occurrence of an accident.

The generated learning model is stored in the accident determination unit 224 of the information processing apparatus 200. Even when machine learning is applied, the accident determination process is the same as described in FIG. 25. In steps S132, S134, and S136, respectively, a learning model according to the transport scene is used to determine the occurrence of an accident.

Figure 18:
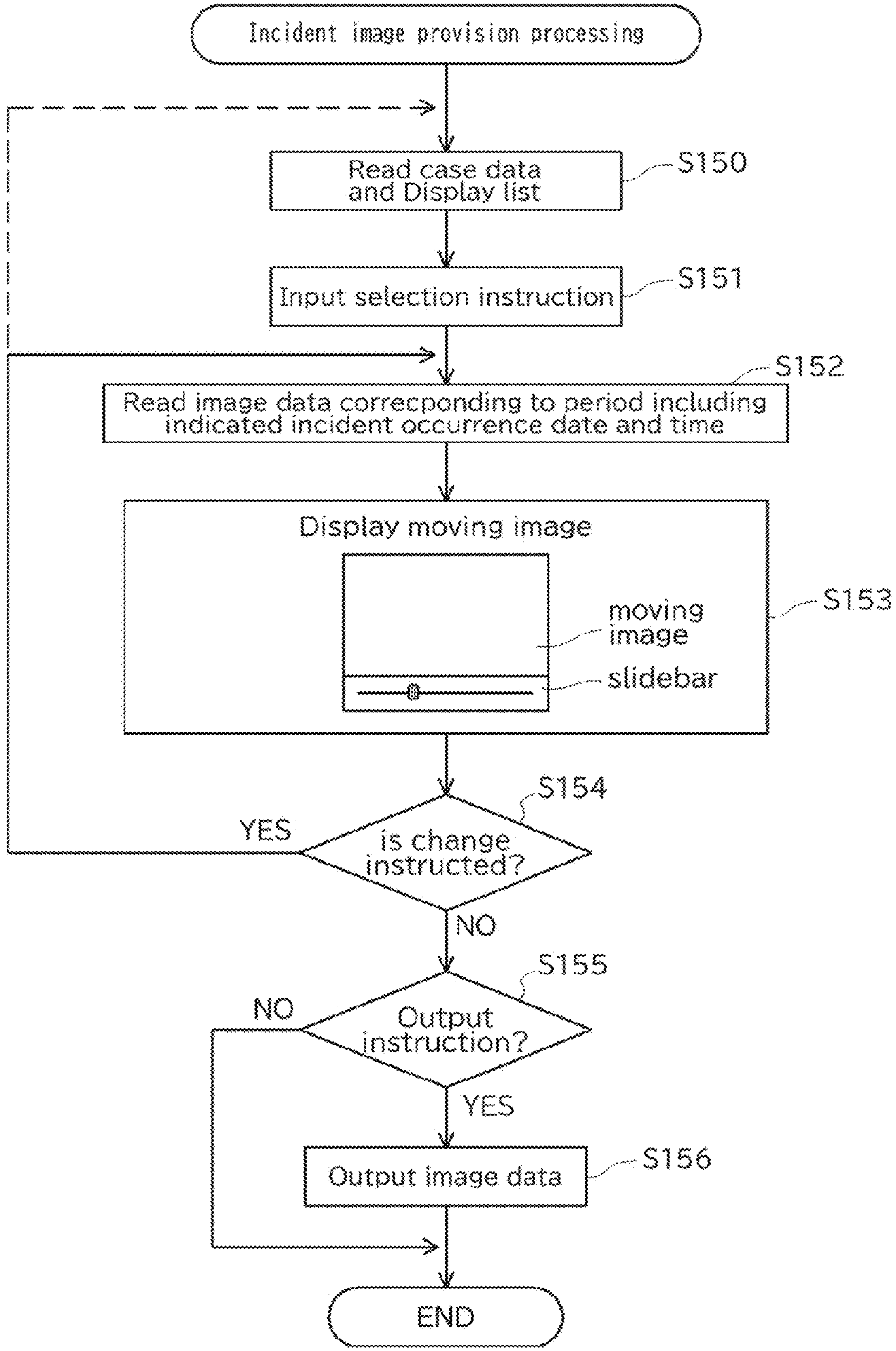
FIG. 18 is a flowchart of incident image provision processing.

(6) Image Provision at the Time of the Accident:

FIG. 18 is a flowchart of incident image provision processing. It is a process mainly performed by the image-in-hazard provision unit 235 shown in FIG. 4, and in hardware, it is a process executed by the CPU of the information processing unit 200. When the process starts, the information processing apparatus 200 reads the case data stored in the incident database 204 and displays the list on the computer 30 (step S150). The incident data stores the date and time of accidents and other abnormalities that have occurred so far.

When the operator selects any one from the list, the information processing apparatus 200 accepts the selection instruction (step S151) and reads the image data corresponding to the period including the indicated incident occurrence date and time (step S152). In the incident database 204, data representing the storage location of image data for the period before and after including the occurrence date and time for each incident is stored. The information processing apparatus 200 reads the corresponding image data from the image database 203 according to the data.

The information processing apparatus 200 displays a moving image on the computer 30 based on the read image data (step S153). For display, as shown, a standard viewer of the moving image can be used. The operator can use the slide bar to repeatedly view a part of the moving image or to make it stationary.

In case the operator instructs to change the image data (step S154), or the operator instructs a change of the length of the image, or the start/end time of the image, the information processing apparatus 200 repeats the processes of steps S152 and S153. When the operator instructs a change in the case itself, the process after step S150 is repeated.

When the operator does not instruct the change of the image data (step S154), but indicates the output (step S155), the information processing apparatus 200 outputs the corresponding image data (step S156) and ends the incident image provision process. In this case, the output is a process of recording image data on a medium or the like or transmitting it via a network so that the image can be viewed by a computer other than the computer 30. When the operator does not indicate output (step S155), the information processing apparatus 200 skips this process and ends.

In the incident image provision process, not only the image data at the time of the incident but also various operation result data at that time, for example, the position of the crane, the operation state, the operation contents of the controller, and the like may be output together.

(7) Effects:

According to the accident determination process described above, the information processing apparatus 200 can determine the occurrence of an accident while the crane is in operation, and performs measures such as notifying. Therefore, the crane manager can promptly deal with the accident.

In addition, since the time of the accident is recorded, it is possible to easily confirm the situation at that time with an image. In addition, since this image data can also be provided to the outside, it can be used by external organizations to analyze the accident situation and the like.

G. Security Function

Figure 19:
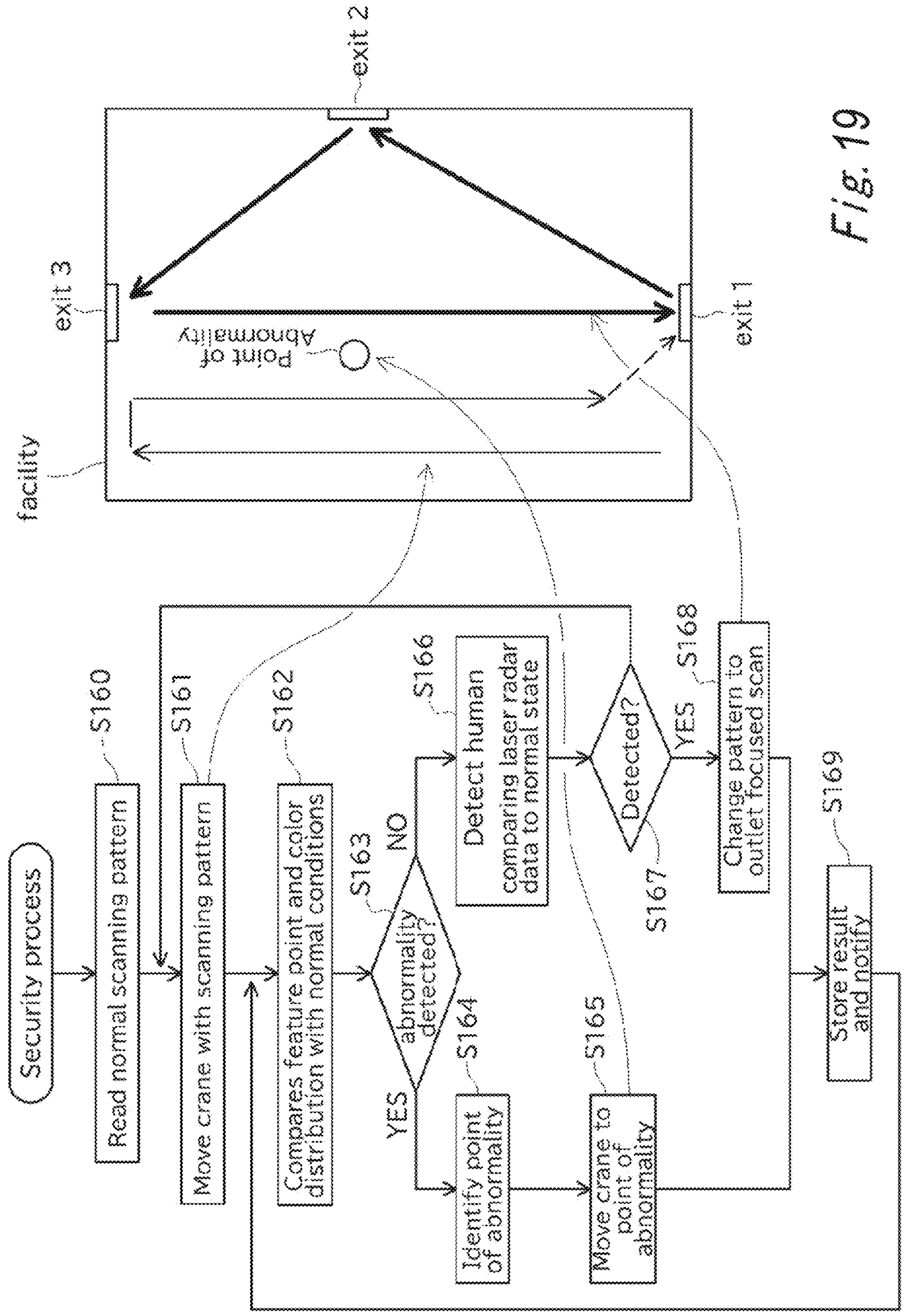
FIG. 19 is a flowchart of security processing.

Cranes are used to transport suspended loads as a normal operation. However, after the end of work at the facility, it can be used for monitoring by taking advantage of the fact that the camera 124 is mounted on the crane. In the following, examples of using cranes for monitoring fires and suspicious persons are described. FIG. 19 is a flowchart of the security process. It is a process mainly performed by the security operation unit 225 shown in FIG. 4, and in hardware, it is a process executed by the CPU of the information processing apparatus 200.

When the process starts, the information processing apparatus 200 reads the normal scanning pattern (step S160) and moves the crane with the scanning pattern (step S161). The right side of the figure shows the normal scanning pattern. Under normal conditions, as shown on the left side of the figure, the facility is scanned in a zigzag pattern. By doing this, images of the entire facility can be sequentially photographed with the camera 124.

The information processing apparatus 200 analyzes the image captured by the camera 124 and the three-dimensional point cloud obtained by the laser radar 125, and compares the feature point and the color distribution with normal conditions (step S162). The feature point is data representing the shape of an edge or the like of equipment in a facility. When the feature point is different from the normal state, it is judged that an abnormality has occurred, such as equipment in the facility being moved, or not clearly visible due to obstacles or smoke. In addition, if the color distribution is different from the normal state, it can be judged that the effect of the fire flame has appeared.

When it is determined that there is an abnormality based on the comparison in step S162 (step S163), the information processing apparatus 200 determines that there is a possibility that a fire has occurred and identifies the point where the abnormality has occurred (step S164). The point of abnormality can be identified, for example, by identifying a place in the image where the feature point or color distribution is different from that of normal state and specifying the equipment corresponding to the location.

When the point of abnormality is identified, the information processing unit 200 stops the normal scanning pattern and moves the crane to the point of abnormality (step S165). By doing this, the camera 124 and the laser radar 125 can record the state of the point of abnormality. The information processing apparatus 200 stores the result in the incident database 204 and reports it (step S169). The notification can be made in the same manner as in the case of an accident (step S138 in FIG. 16).

On the other hand, when it is determined that there is no abnormality in the comparison of step S162 (step S163), the information processing apparatus 200 performs human detection based on the acquired data (step S166). In the embodiment, the three-dimensional point cloud obtained by the laser radar 125 is compared with the normal state. The difference between the acquired and normal state of three-dimensional point clouds is executed and judged whether this can be recognized as a human shape.

When a human being cannot be detected (step S167), since it is judged that there is no abnormality for either the fire or the suspicious person, the normal scanning pattern is continued (step S161).

On the other hand, when a human being is detected (step S167), the information processing apparatus 200, considering that there may be a suspicious person, aborts the normal scanning pattern and changes it to an outlet focused scan (step S168). The right side of the figure illustrates an exit-focused scan. When there are three exits, exit 1 to 3, in the facility, the crane is scanned in a pattern that patrols these exits as shown by the arrow in the figure. Since the movement speed of crane is generally not as fast as that of humans, it is difficult for crane to completely follow suspicious persons. Suspicious persons, on the other hand, must use one of the exits in order to escape from the facility. Therefore, by switching the scanning pattern of the crane to exit-focused scanning, the possibility of capturing the appearance of suspicious persons can be improved. In the exit priority scan, when a suspicious person is detected near the exit, the scanning may be stopped and the exit may be captured intensively.

When the information processing apparatus 200 detects a suspicious person, the result is stored in the incident database 204 and a report is performed (step S169).

According to the security process described above, the crane can be used for monitoring in addition to carrying suspended loads. In addition, when an abnormality is found, the possibility of being able to record the situation is improved by changing the scan pattern. Since the abnormality information is stored in the incident database 204, by utilizing the incident image provision process (FIG. 18), image data at the time of abnormality can be provided, and there is also an advantage that the situation can be easily verified ex post facto.

In the security process, when fixed cameras are installed in the building, cooperation with these cameras may be considered. For example, each image obtained with a fixed camera has a blind spot. Therefore, the normal state scanning pattern of the crane may be set to cover these blind spots. Since the blind spot of the fixed camera also varies depending on the situation such as a device or a luggage placed on the floor, etc., the normal scanning pattern may be changed accordingly.

In addition, the movement of the crane when an abnormality is discovered may also be set based on the area covered by the fixed camera. For example, if the area around the doorway is covered by a fixed camera, it is conceivable to move the area to follow the suspicious person as much as possible.

H. Lift-Off Safety Support Function

When hooking a wire attached to a suspended load to a hook of a crane and lifting it, it is difficult to accurately lift the center of gravity of the load, and there is often a slight deviation between the position of the hook and the center of gravity of the load. Therefore, conventionally, due to this deviation, the suspended load may swing left and right or back and forth at the moment when the lift-off, that is, the suspended load leaves the floor, and there is a danger such as colliding with a operator who was working in the vicinity of the suspended load.

In this embodiment, it is provided with a lift-off safety support function for suppressing such a danger. Hereinafter, the function is described.

Figure 20:
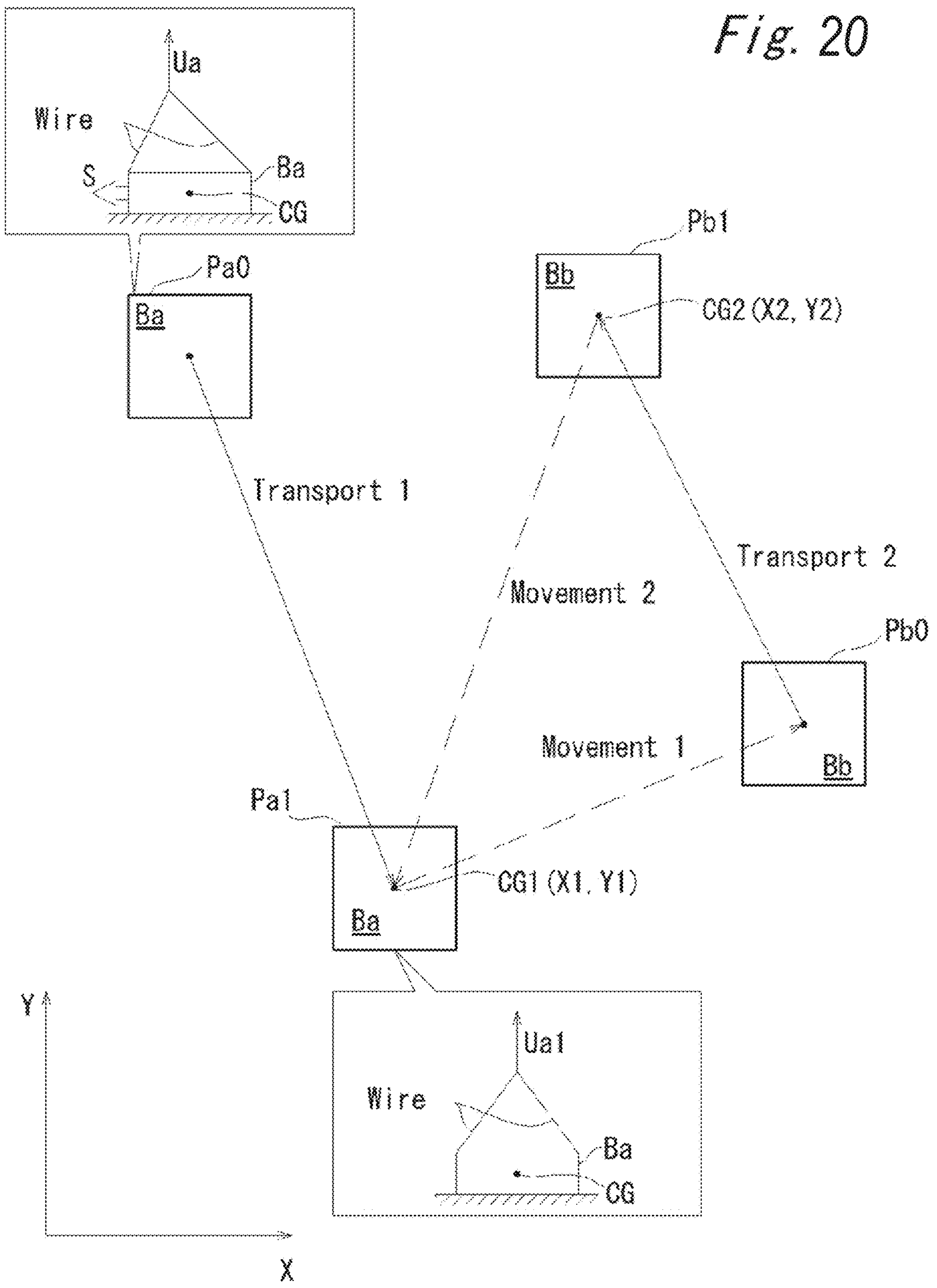
FIG. 20 is an explanatory diagram showing an outline of the lift-off safety support process.

FIG. 20 is an explanatory diagram showing an outline of the lift-off safety support process. It shows the situation when transporting suspended load Ba and Bb. First, consider the case where the suspended load Ba is transported from the position Pa0, upper left, to the position Pa1, lower, by a crane. In the vicinity of the position Pa0, side view of the lifting is schematically shown. When a wire is attached to the suspended load Ba and lifted like an arrow Ua, the position of the center of gravity CG is judged by visual measurement or the like, so it is difficult to accurately lift the center of gravity CG. Therefore, if the crane is hoisted up like an arrow Ua, there is a risk that the load will swing like an arrow S at the moment when the suspended load Ba leaves the floor. This is the swing at the time of lift-off.

The suspended load Ba is transported to the position Pa1 as shown as the arrow indicated as transport 1 and landing down. In the vicinity of the position Pa1, the side view of the load at the time of lowering is schematically shown. During the transportation, the crane is precisely lifting on the center of gravity CG of the suspended load Ba like arrow Ua1 with wire. Therefore, the position of the crane at the time when the suspended load Ba is landed is a position where the suspended load Ba can be accurately lifted on its center of gravity CG when the suspended load Ba is lifted next. Therefore, the information processing apparatus 200 of the embodiment stores the coordinates CG1 (X1, Y1) at this time in association with the suspended load Ba.

After landing the suspended load Ba, the crane moves to the position Pb0 where the suspended load Bb is placed in an empty state as shown as a dashed line arrow indicating transport 1. At this point, as previously described about the suspended load Ba, there is a risk that swing at the time of lift-off may occur.

Then, the crane lifts the suspended load Bb and conveys it to the position Pb1 as shown in the arrow indicated as the transport 2. When landing at position Pb1, since the crane is precisely lifting of the center of gravity of the suspended load Bb, the position coordinates of the crane at the time of landing are useful for accurately lifting on the center of gravity when lifting the suspended load Bb next. Therefore, the information processing apparatus 200 of the embodiment stores the coordinates CG2 (X2, Y2) at this time in association with the suspended load Bb.

After that, consider the case where the crane transports the suspended load Ba again. For example, in the case where the suspended load Ba and the suspended load Bb are molds used in the factory, the mold is installed on the machine, and when the processing is completed, it is repeatedly removed from the machine and stored in a predetermined position.

As described above, when the suspended load Ba is first transported and landed, its position coordinates C1 (X1, Y1) are registered. Therefore, when the operator calls the position coordinate C1 from the registered position information, the crane moves to the position coordinate C1 as indicated by the arrow of movement 2. After the operator visually moves to the vicinity of the position coordinate C1, the position may be modified so as to match the position coordinate C1.

When the movement is completed, the crane is hoisting up the suspended load Ba. If it is lifted at the position coordinate C1, the positional relationship between the center of gravity of the crane and the suspended load Ba can be accurately reproduced, and the swing at the time of lift-off can be suppressed.

In this way, the position information of the crane when the suspended load is landed is stored, and the concept of the lift-off safety support function is that the positional relationship between the center of gravity of the suspended load and the crane are accurately reproduced according to the stored data.

In the lift-off safety support function according to the above-described concept, the following ingenuity may be provided in order to accurately reproduce the positional relationship between the center of gravity position and the crane.

Figure 21:
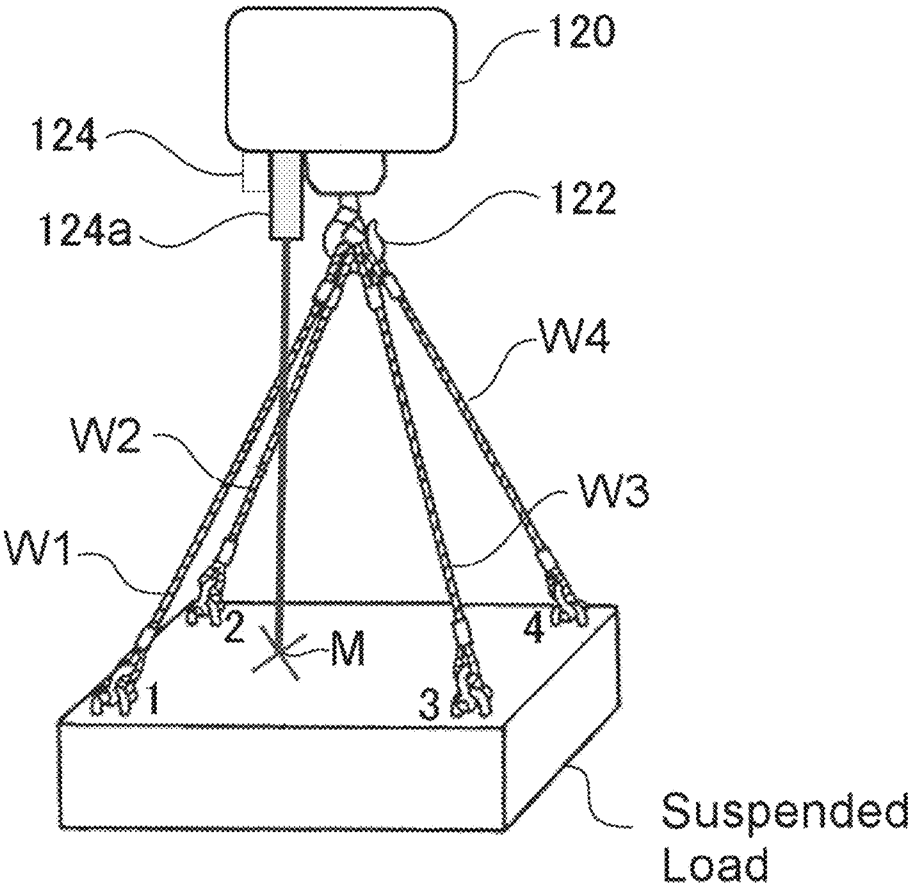
FIG. 21 is an explanatory diagram showing the hanging state of a suspended load by a crane.

FIG. 21 is an explanatory diagram showing a suspended load by a crane. Wires W1 to W4 are attached to the four corners of the suspended load, and the suspended load is lifted by hooking these wires to the hook 122 of the hoist 120. At this time, strictly speaking, in case the order in which the wires W1 to W4 are hooked to the hook 122 is changed, the tension of each wire varies, and the resultant force may shift from the center of gravity position of the suspended load. To suppress such an error, for example, as shown in the figure, numbers of 1 to 4 may be drawn at the four corners of the suspended load, and the wires W1 to W4 may be hooked to the hook 122 in the order according to this number. By doing this, since the hooking order of the wire can be accurately reproduced, it improves the accuracy of reproducing the positional relationship between the hoist 120 and the center of gravity.

In the above embodiment, what is drawn at the four corners of the suspended load is not limited to numbers, but may be any identification that can identify the hooking order of the wire to the hook 122.

Further, a laser 124*a* irradiating downward may be attached to the hoist 120. When the suspended load is being transported, the spot M by the laser 124*a* is projected on the upper surface of the load. At the time of landing, the position of this spot M may be marked on the upper surface of the suspended load. It may be a method of affixing a sticker or the like, or it may be marked with a pen or the like.

When the suspended load is transported next time, if the positional relationship between the hoist 120 and the center of gravity of the suspended load is accurately reproduced, the laser 124*a* should irradiate the spot M marked previously. Therefore, the position of the hoist 120 can be reproduced more accurately using the positional relationship between the irradiation by the laser 124*a* and the marked spot M.

In this embodiment, since the camera 124 is attached to the hoist 120, the position of the hoist 120 may be controlled so that the irradiation by the laser 124*a* and the marked spot M are detected based on the captured image, and the position of the hoist 120 may be controlled so that there is no deviation.

The captured image by the camera 124 can also be used in another aspect. First, a captured image may also be associated and registered at the time of registration of the position coordinates at the time of landing. By doing this, when the position coordinates are called to transport the suspended load again after landing, the position information can be intuitively and correctly read out based on the captured image. Further, when lifting the suspended load, the position of the hoist 120 may be controlled so as to match the image taken by the camera 124 and the registered captured image. By doing this, it is possible to improve the positional relationship between the two more accurately.

Hereinafter, the process to be executed for the lift-off safety support function will be described. This process is mainly executed by the lift-off safety support unit 250 (see FIG. 4), and is in hardware a process executed by the information processing apparatus 200.

Figure 22:
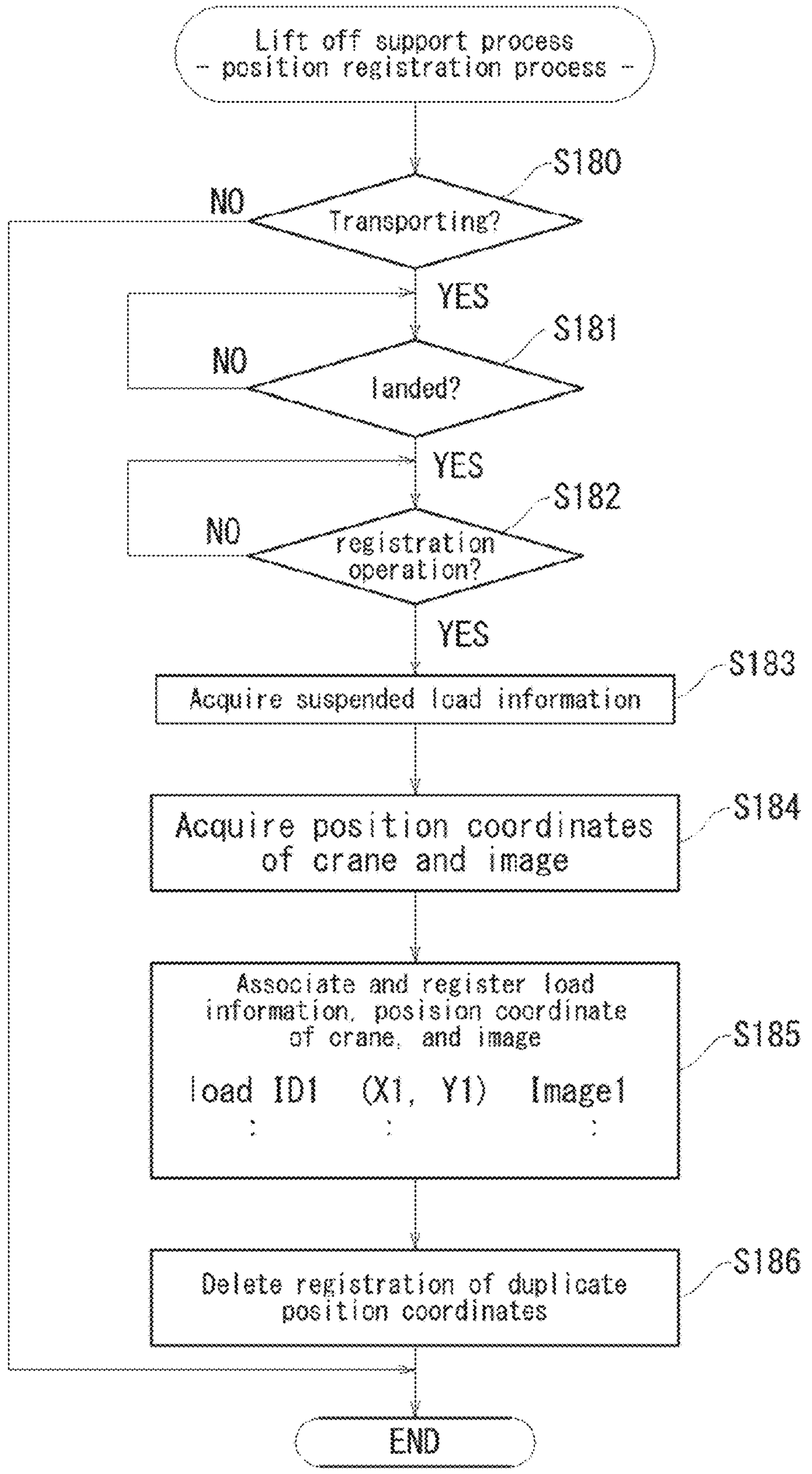
FIG. 22 is a flowchart of position registration process in the lift off safety support process.

FIG. 22 is a flowchart of the position registration process in the lift off support process. This process is repeatedly performed when the suspended load is being transported by a crane. When processing starts, the information processing apparatus 200 determines whether the suspended load is being transported (step S180). When it is not being transported, this process is terminated without performing anything in particular. The determination of whether or not the transporting may be determined, for example, based on the load applied to the crane, or may be determined based on the image taken by the camera 124.

When the suspended load is being transported (step S180), it is then determined whether the suspended load has been landed (step S181). If not yet landed, it waits until the landing.

Then, when the suspended load is landed, it is determined whether the position coordinate registration operation has been performed by the operator (step S182). The registration operation can take various aspects. For example, a button for registration may be provided on the controller of the crane.

Further, after the suspended load is landed, the wire is removed, and the wire is winded up in the state of an empty load, this may be regarded as an instruction of registration. Wire winding-up may be, regardless with or without the suspended load, determined as an instruction for registration. However, in consideration of the possibility that a case may occur in which the suspended load is re-winding up for minor correction of the position after being landed once, it is preferable to add a process to exclude this.

When the registration operation is performed, the information processing apparatus 200 acquires the suspended load information (step S183). The suspended load information is information for identifying the suspended load. For example, the operator may register the name, type, size, and the like as the suspended load, or may select these from the suspended load information registered in advance. Since the controller for the crane is often not suitable for identifying complex information like these, for example, the information processing apparatus 200 and a smartphone, tablet, or other terminal owned by the operator may be connected and registered.

Further, since the suspended load is used for specifying the relationship between the position information and the suspended load, the information processing apparatus 200 may assign identification information, like a suspended load ID, to each suspended load. In this case, writing down the suspended load ID on the surface of the suspended load makes it possible to identify the suspended load thereby. In addition, if the date and time are included in the suspended load ID, it is possible to roughly identify the suspended load by the work history of transporting the suspended load.

Using the suspended load information in this way, the mistake using wrong the position information for different suspended loads can be suppressed.

Next, the information processing apparatus 200 acquires the position coordinates of the crane and the image taken by the camera 124 (step S184). Then, the suspended load information, the position coordinates of the crane, and the image are associated and registered (step S185). An example of registration is shown in the figure. Suspended load ID1 represents suspended load information, (X1, Y1) represents position coordinates, and Image1 represents an image. It should be noted that the image may be omitted.

Then, the information processing apparatus 200 deletes the registration of duplicate position coordinates (step S186). In this embodiment, since the position coordinates when the suspended load is landed are registered, duplicate position coordinates should not be registered. Here, duplicate means that the distance between the two position coordinates is less than the value set considering the size of the suspended load. The existence of duplicate position coordinates means that another suspended load has landed where the suspended load already exists, which is impossible and the previous position coordinates are concluded as incorrect. Therefore, the information processing apparatus 200 obliterates such position coordinates.

As a specific process, a position coordinate existing within a predetermined distance from the position coordinates registered in step S185 may be retrieved from the registered data and this may be deleted. In addition, if the position coordinates are appropriately managed so as not to cause duplication, it may be possible to omit the process of step S186.

Figure 23:
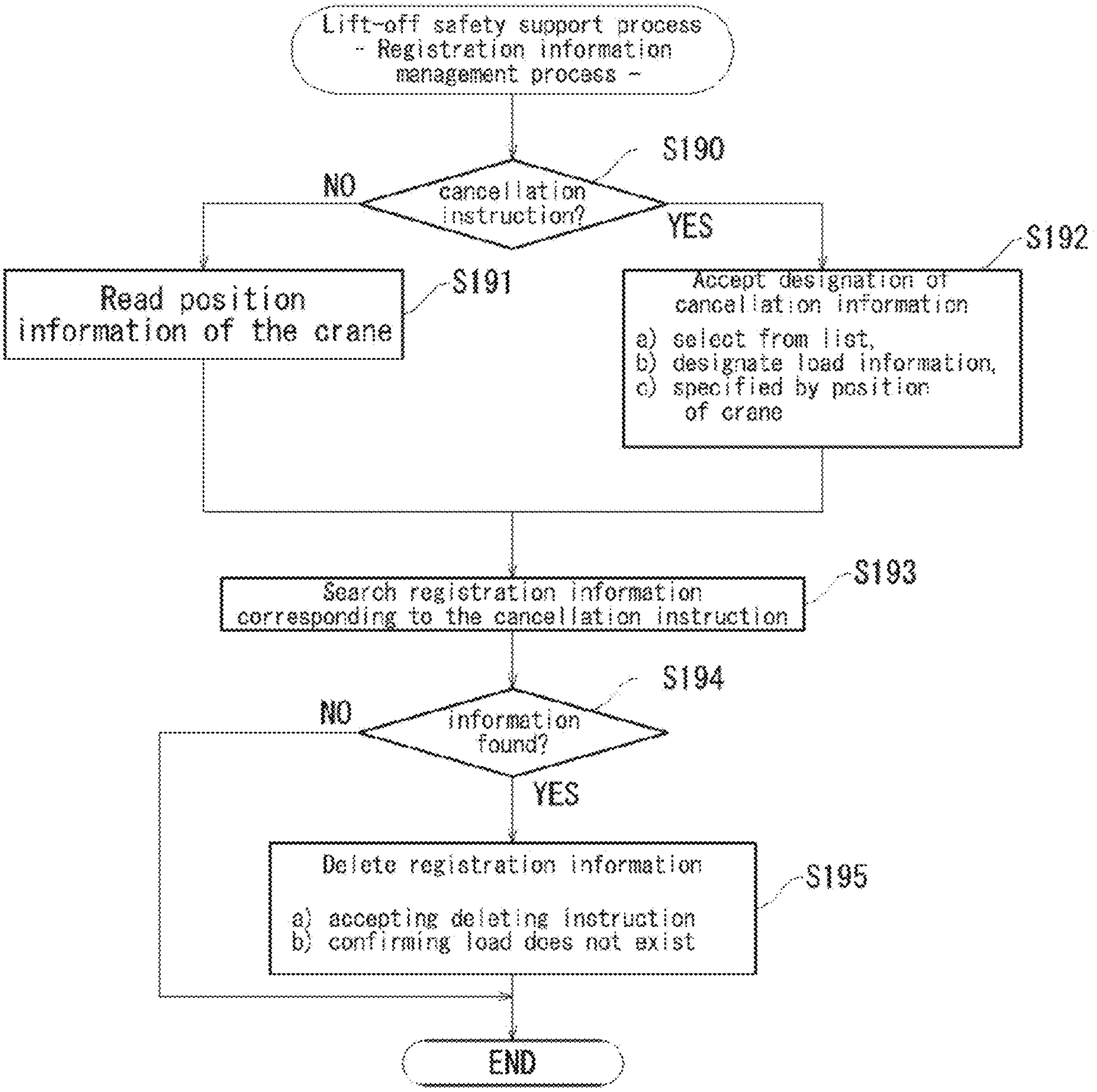
FIG. 23 is a flowchart of registration information management processing in the ground clearing safety support process.

FIG. 23 is a flowchart of registration information management process in the lift-off safety support process. It is a process of managing location information that has already been registered, and it is a process mainly aimed at deleting position information that has become useless.

The case where the registered position information becomes useless is when the suspended load that has been landed is moved. Suspended loads are not necessarily moved by cranes alone. Depending on the type of suspended load, it may be moved by another means such as a forklift, or it may be moved by another crane. In addition, depending on the suspended load, it may be disposed of by disposal or the like.

In such a case, if the registered position information is left behind, not only wasting the storage capacity, but there is also a risk that it may be used incorrectly when transporting other suspended loads. Therefore, it is preferable to delete the location information that becomes useless as appropriate.

In this embodiment, the operator individually designating and deleting unnecessary position information and the information processing apparatus 200 automatically deleting those are used in combination.

When this process is started, the information processing apparatus 200 determines whether a cancellation instruction has been given (step S190). The cancellation instruction is an instruction for deleting the registered location information. A specific button may be provided on the controller, or the instruction may be given by a smartphone or other terminal connected to the information processing terminal 200.

When the cancellation process has been instructed, the information processing apparatus 200 accepts the designation of cancellation information (step S192). Several methods can be taken for the designation. For example, the registered position information may be displayed on the controller as a list, and one to be canceled may be selected. Further, since the position information is registered in association with the suspended load information, the position information to be canceled may be specified in the suspended load information.

Further, it may be specified based on the position information of the crane. For example, in a situation where the registered position information is called to transport a suspended load and the crane is moved, but it moved to a place where there is no suspended load, the useless position information can be easily canceled as a target.

On the other hand, when no cancellation instruction has been given (step S190), the information processing apparatus 200 appropriately reads the position information of the crane (step S191).

Then, the information processing apparatus 200 searches for registration information corresponding to the cancellation information instructed in step S192 or registration information corresponding to the position information read in step S191 (step S193). If the corresponding registration information cannot be found (step S194), the registration information management process is terminated without doing anything in particular.

If the corresponding registration information is found, the information processing apparatus 200 deletes the registration information if any of the following conditions are satisfied (step S195).

Condition 1 is to accept the deleting instruction. Even if the cancellation information is specified, it is confirmed again so as not to erase the erroneous location information.

Condition 2 is that it is confirmed that the suspended load does not exist at the position corresponding to the registration information. When the cancellation instruction is not received, the registration information corresponding to the position coordinates of the crane read in step S191 is found, but the information is not necessarily incorrect. This is because sometimes there is only a crane of empty load moving over the place where the suspended load is placed. Therefore, based on the image of the camera 124 and the like, it is determined whether or not there is a load in the registration information, and if the load does not exist, it is judged to be incorrect registration information and deleted.

Using these conditions, unnecessary location information registration can be deleted.

Figure 24:
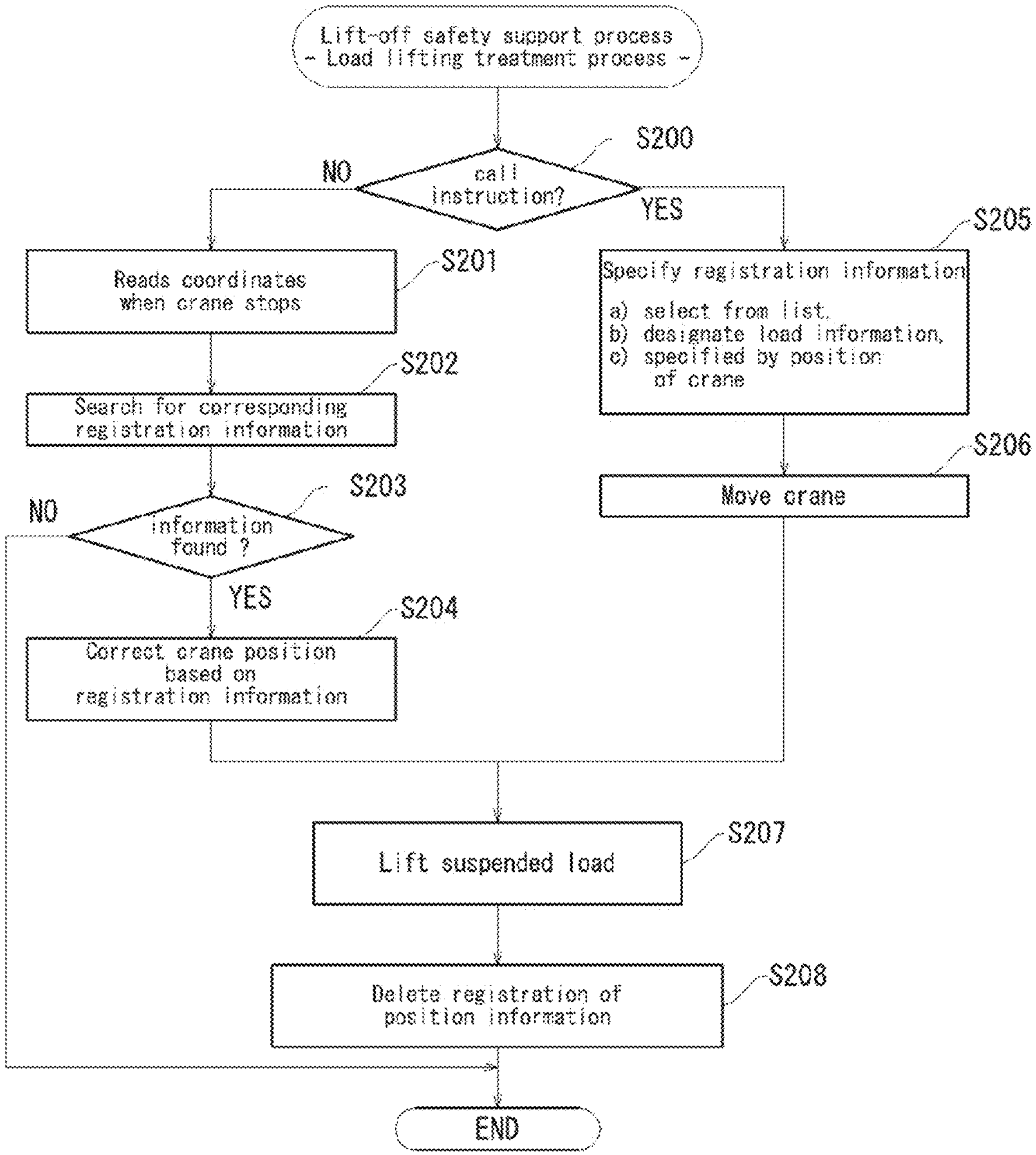
FIG. 24 is a flowchart of load lifting treatment in lift off safety support processing.

FIG. 24 is a flowchart of the suspended load lifting treatment in the lift-off safety support process. It is a process when transporting a suspended load using registered position information. When the process starts, the information processing apparatus 200 determines whether a call instruction for the registration information has been performed (step S200). When a call instruction is given, the specification of registration information is accepted (step S205). This designation can be obtained in three ways, as described in the cancellation instruction (step S192 in FIG. 23). Then, when the registration information is specified, the crane is moved based on the position information (step S206).

On the other hand, when no call instruction is given (step S200), the crane is moving or the like according to the operation of the operator, but the information processing apparatus 200 reads its coordinates when the crane stops (step S201). Then, search for the corresponding registration information (step S202). If the corresponding registration information cannot be found (step S203), the process is terminated without doing anything.

When the corresponding registration information is found (step S203), it is judged that the suspended load placed near the stopping position of the crane is about to be lifted, so the position of the crane is corrected based on the registration information (step S204). Since it is dangerous to move the crane without the operation of the operator, it is preferable to wait for instruction by the operator to move it for alignment before moving.

By the above processing, when the registration information is called (steps S205, S206) and when the operator moves the crane to the vicinity of the suspended load visually or the like (step S201 to S204), the crane should be moving above the center of gravity of the suspended load.

Therefore, the information processing apparatus 200 performs lifting of the suspended load according to the instructions of the operator (step S207). At this time, to accurately lift the center of gravity, the information processing apparatus 200 may compare the registered image with the image taken by the camera 124 and determine whether or not there is a deviation. When there is a deviation of more than a predetermined amount, since swing at the time of lift-off may occur, it is preferable to stop hanging or to alarm.

When the suspended load is lifted, the registered position information becomes useless, so the information processing apparatus deletes the registration of the position information (step S208). By doing this, the risk using the useless position information by mistake can be avoided.

According to the lift-off safety support function described above, the risk of swing occurring at the time of lift-off can be suppressed when lifting the suspended load.

I. Effects and Modifications

As described above, the information processing apparatus 200 and the learning model generation system 500 as examples have been explained. The various features described above are not necessarily installed, and may be omitted or combined as appropriate.

For the present invention, in addition to the examples, various modifications can be constructed. In the embodiment, a crane for transporting a suspended load in a facility has been illustrated, but it may be applied to a care crane for transporting a person to be cared for in a nursing care facility. In addition, various modifications are possible.

The present invention can be utilized for processing information acquired during the operation of a crane that moves suspended loads within a specified area.

What is claimed is:

1. An information processing apparatus for processing information acquired during operation of a crane that moves a suspended load within a specified area, the crane including a lifting device which is horizontally movable and lifts the suspended load, the information processing apparatus comprising:
- a data acquisition unit mounted on the lifting device and configured to acquire at least one of an image, an infrared radiation, and a three-dimensional point cloud, while moving with the lifting device; and
- an abnormality detection unit configured to discover an abnormal situation including at least one of an accident, fire or presence of a suspicious person, based on the data acquired by the data acquisition unit,
- wherein the abnormality detection unit including at least one of;
  - an accident determination unit that determines whether or not an accident has occurred based on a positional relationship between the suspended load and a person or obstacles in a vicinity of the suspended load, and a posture of the person; and
  - a security operation unit configured to drive the lifting device with a predetermined scanning pattern, determine presence or absence of an abnormality based on the data acquired by the data acquisition unit while the lifting device is being driven, and execute a predetermined security operation if an abnormality is present.

2. The information processing apparatus according to claim 1, wherein the accident determination unit is configured to determine that an accident has occurred if a figure of a fallen person is detected within a predetermined range from the suspended load.

3. The information processing apparatus according to claim 1, further comprising:
- an operation results database for storing data for identifying the positional relationship between the suspended load and the person or obstacles and the posture of the person as operation results,
- wherein the accident determination unit is configured to determine an occurrence of an accident using a learning model which is obtained by unsupervised machine learning based on the operation results database.

4. The information processing apparatus according to claim 1, wherein the accident determination unit is further configured to notify a predetermined recipient when it is determined that an accident has occurred.

5. The information processing apparatus according to claim 1, wherein the security operation unit is configured to change the scanning pattern of the lifting device if the abnormality is discovered.

6. The information processing apparatus according to claim 5, wherein the security operation unit is further configured to determine whether or not a fire has occurred based on the image or the infrared radiation, and move the lifting device to a place of fire if it is determined that a fire has occurred.

7. The information processing apparatus according to claim 5, wherein the security operation unit is further configured to determine a presence or absence of a person based on the data acquired by the data acquisition unit, and move the lifting device to an exit of a facility in which the lifting device is provided, if a presence of a person is determined.

8. The information processing apparatus according to claim 1,
- wherein the data acquisition unit includes a camera configured to take images under the suspended load, the information processing apparatus further comprising:
- an image database configured to store, as image data, the images taken by the camera in time series; and
- an abnormal image supply unit configured to store the image data, in response to the determination of the presence of an abnormality by the abnormality detection unit, in association with time at which the abnormality occurred, and output the image data and the associated time upon request.

9. A learning model generation system for generating a learning model for determining an occurrence of an accident during operation of a crane that moves a suspended load within a specified area, the learning model generation system comprising:
- an operation results database for storing data for identifying a positional relationship between the suspended load and a person or obstacles in a vicinity of the suspended load, and a posture of the person as operation results; and
- an accident determination model generation unit configured to generate a learning model for determining an occurrence of an accident by performing cluster analysis based on the operation results stored in the operation results database.

* * * * *